April 29, 1958 C. H. HAAKANA ET AL 2,832,927
ELECTRICAL CONTROLLING NETWORKS
Filed Oct. 28, 1953 8 Sheets-Sheet 1

INVENTORS:
Carl H. Haakana,
Harry E. Colestock.
BY John L. Stoughton
Their Attorney.

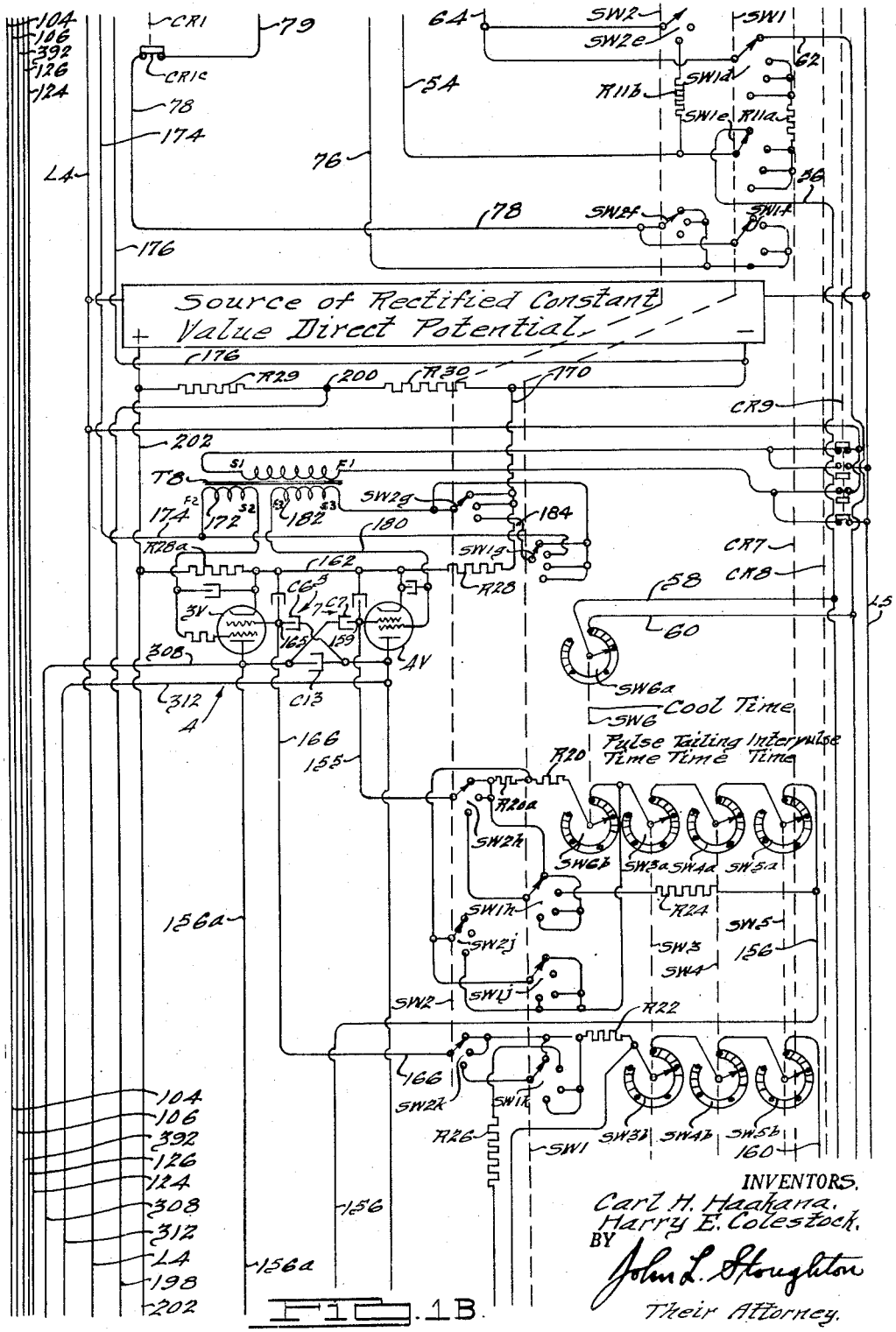

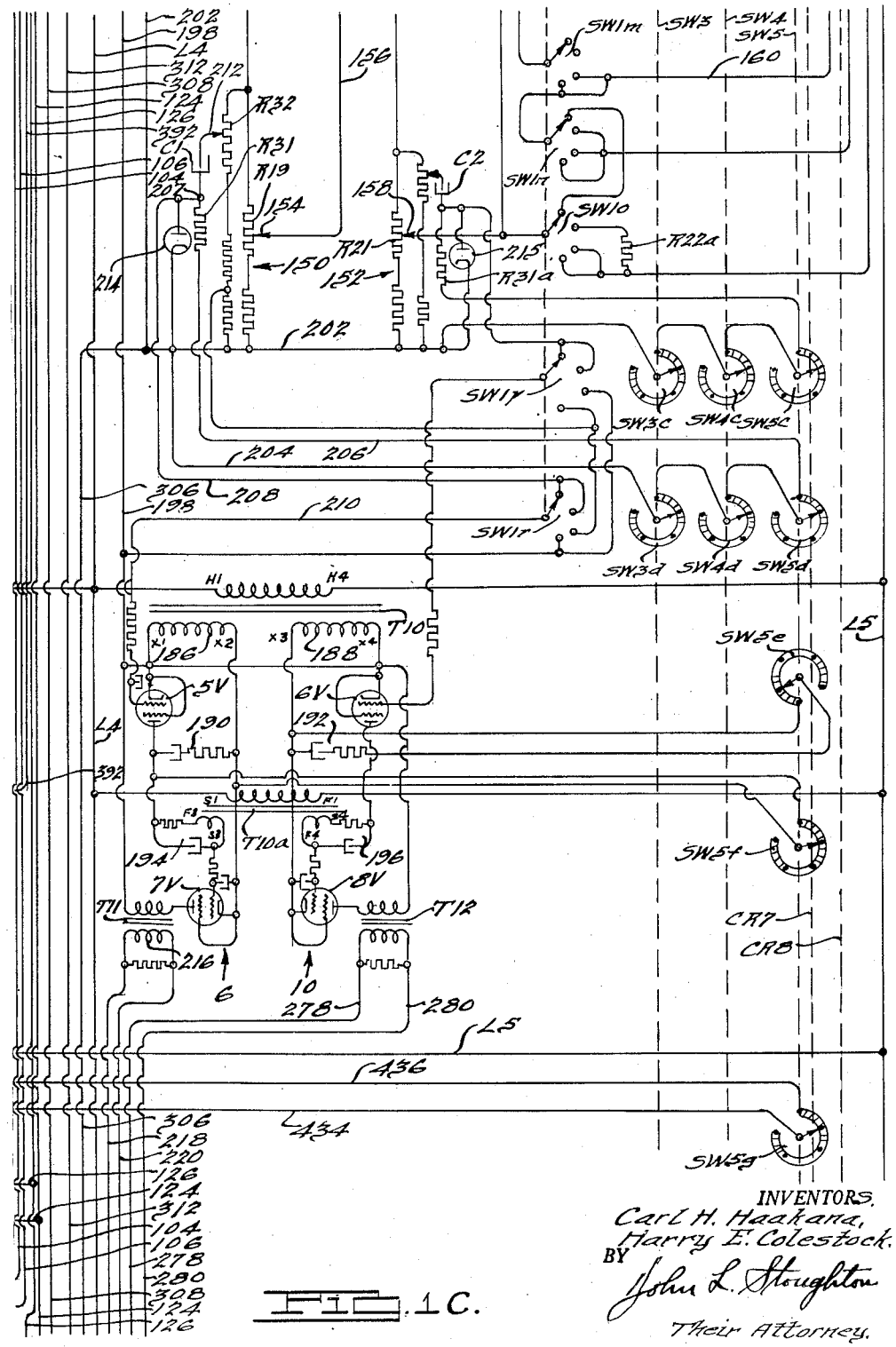

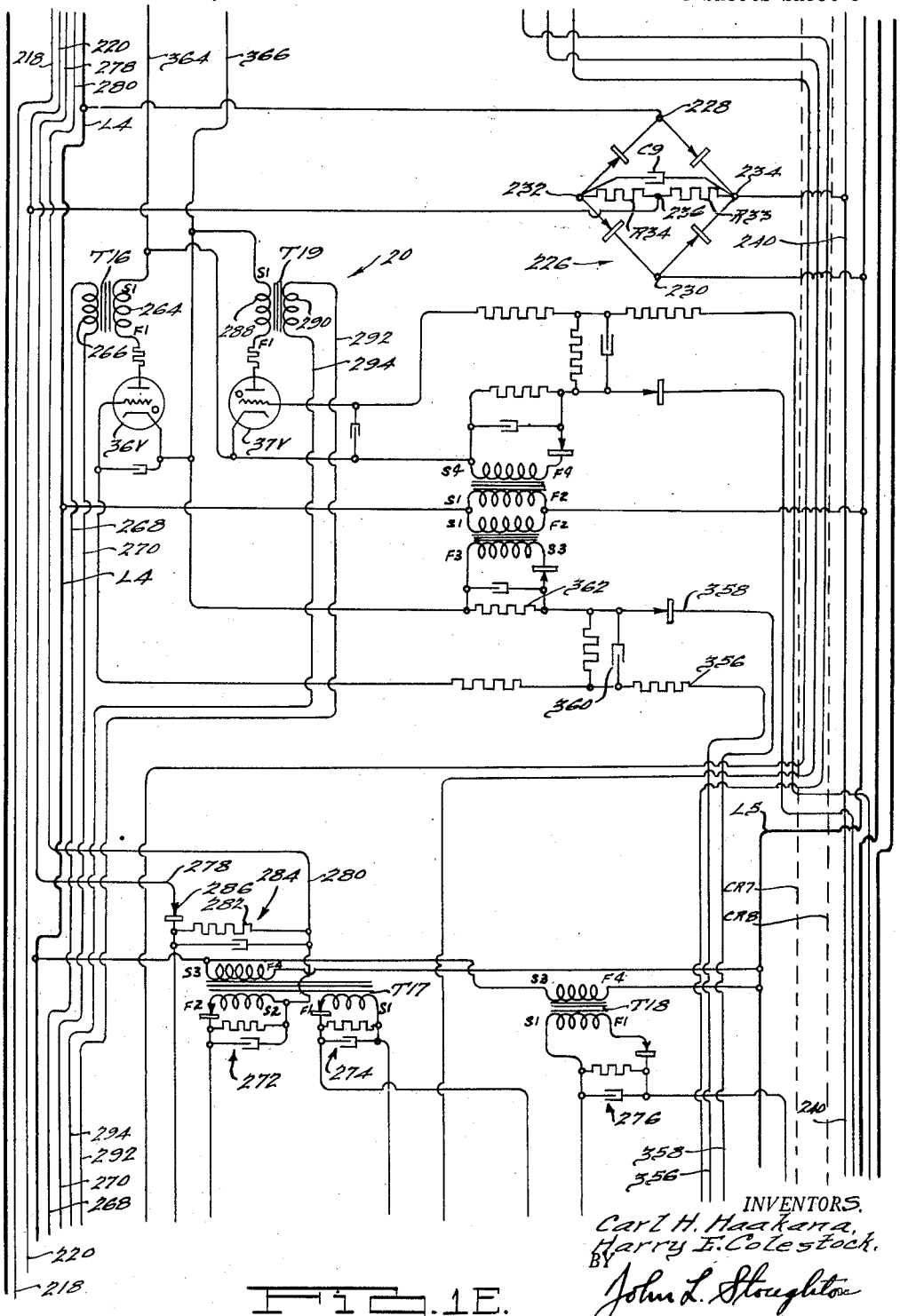

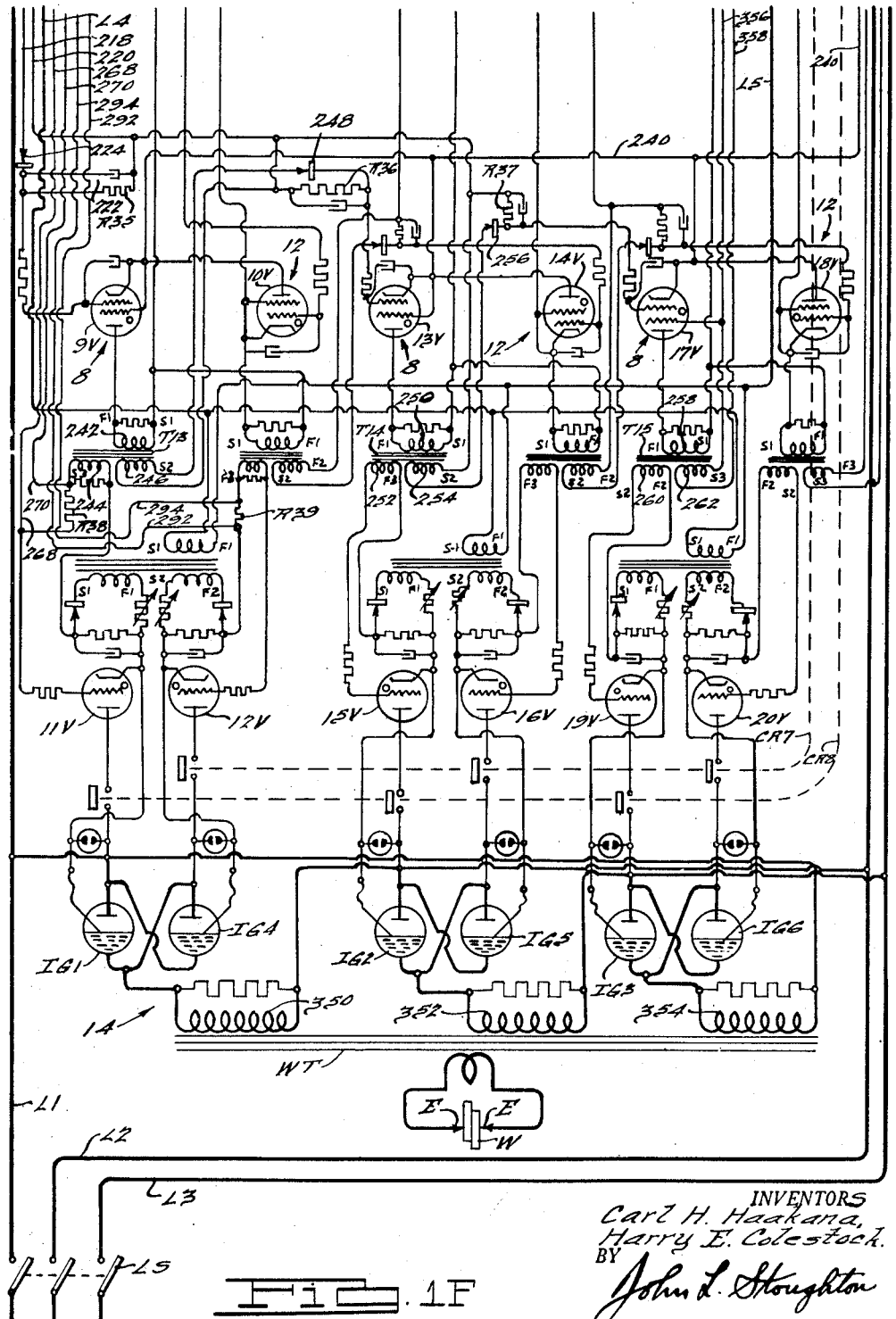

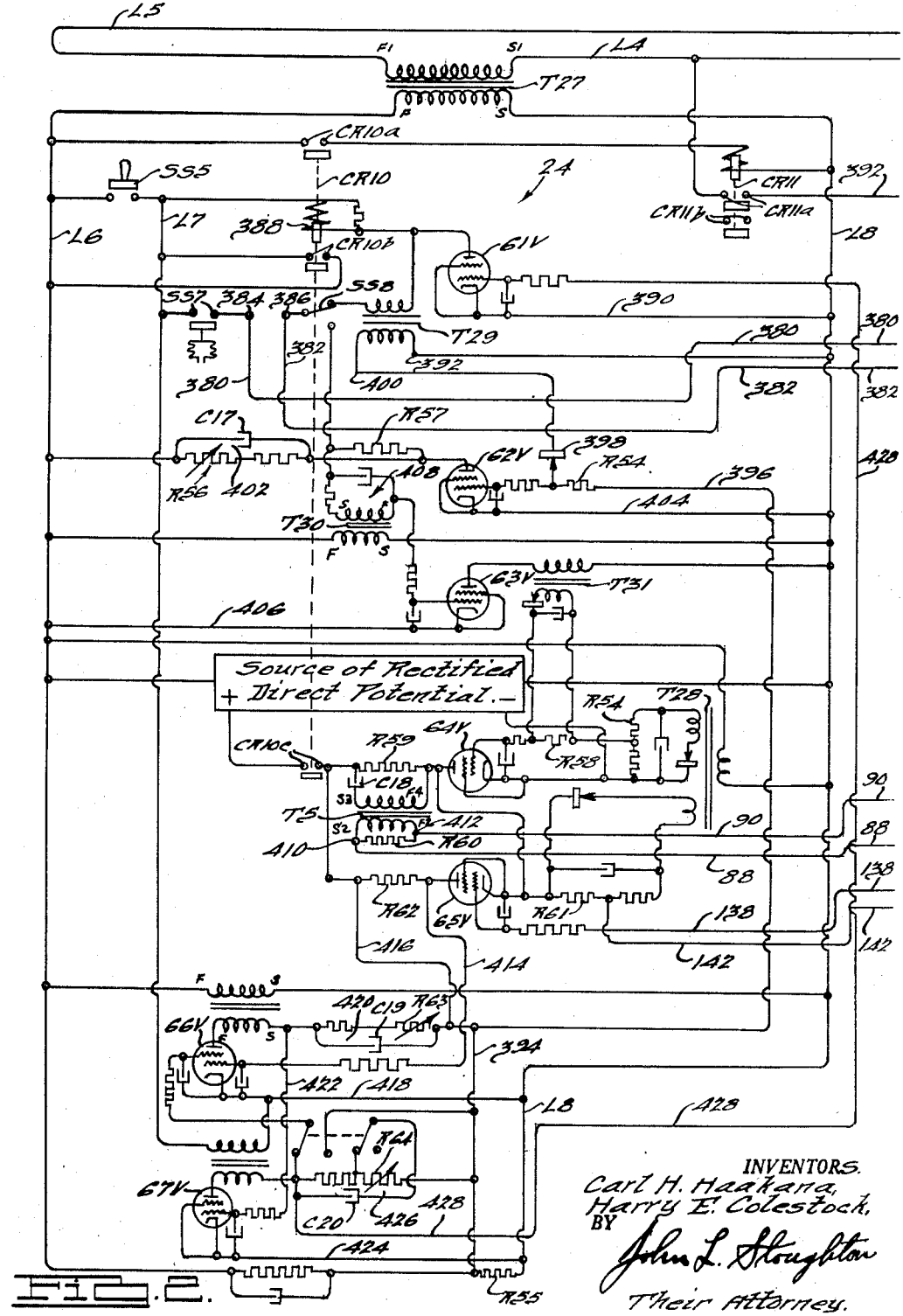

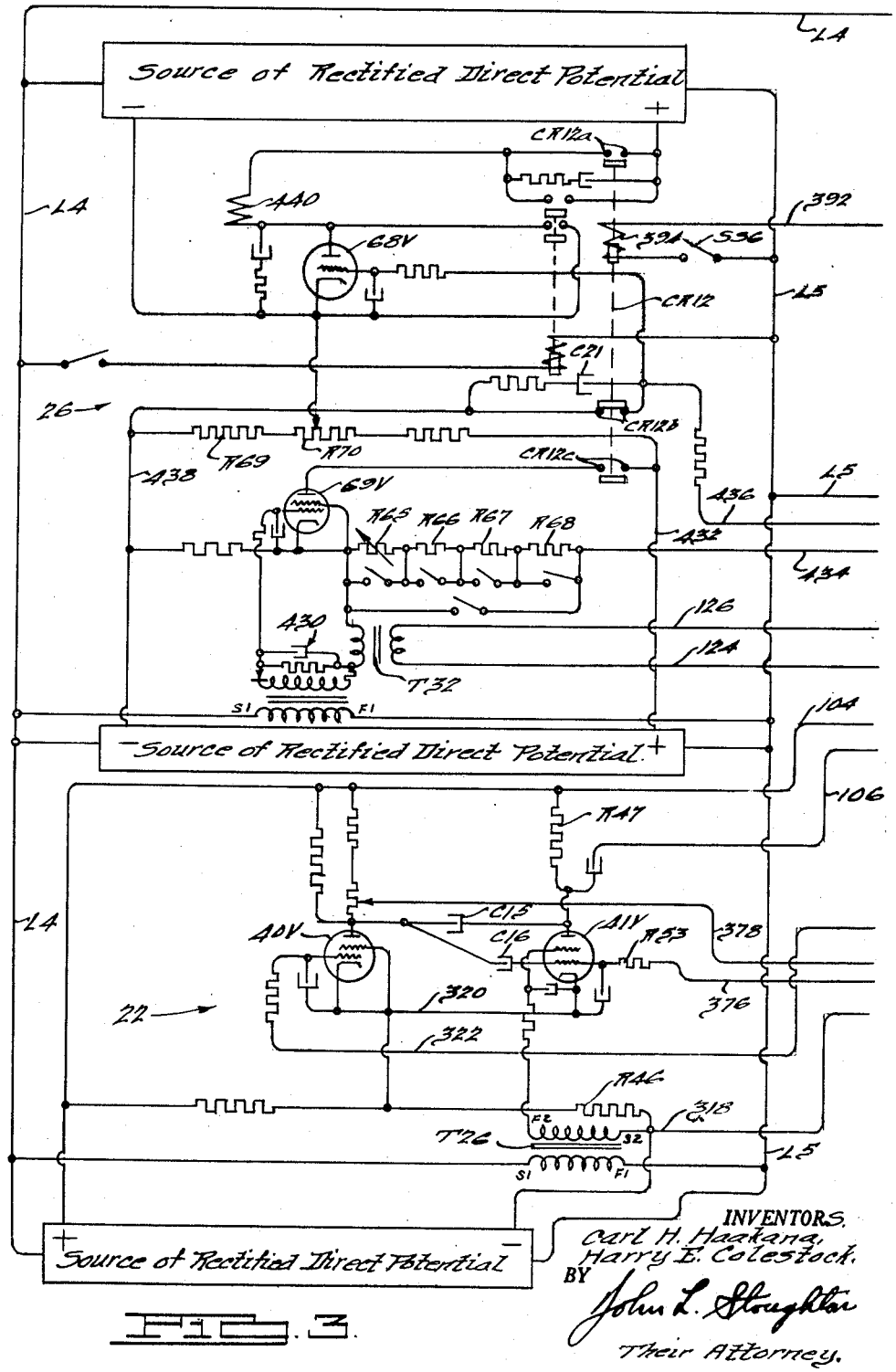

United States Patent Office 2,832,927
Patented Apr. 29, 1958

2,832,927
ELECTRICAL CONTROLLING NETWORKS

Carl H. Haakana, Detroit, and Harry E. Colestock, Commerce Township, Mich., assignors to Weltronic Company, Detroit, Mich., a corporation of Michigan Application October 28, 1953, Serial No. 388,882

21 Claims. (Cl. 321—19)

This invention relates generally to electrical controlling networks and more particularly to networks which are adapted, among other uses, for controlling the supply of electrical energy from a three phase electrical source of commercial frequency to a single phase load operating at a lower frequency and which load may be a pair of resistance welding electrodes.

An object of this invention is to provide an improved network of the character described for controlling the flow of electrical energy to a pair of resistance welding electrodes.

Another object of this invention is to provide such a network which by the manipulation of a single switch may be set to supply energy to operate a welding machine for seam welding or spot welding.

Another object of this invention is to provide a single switch which will cause the energy to be supplied to a seam welder either continuously or as a series of heat pulses each of which is followed by a cool period of controlled duration in which no heat is supplied.

Another object if this invention is to provide a single switch which may be set to provide for full cycle operation in which the power supplied to the welding electrodes during any one welding interval comprises a series of at least one positive and at least one negative half cycle or to provide for only a single half cycle power pulse.

A further object is to provide such a switch which may be set to supply subsequent single half cycles in the same or in alternating polarity and which is selectively set to determine which type will be supplied.

Another object of this invention is to provide an improved control arrangement which eliminates the use of mechanically operated ratchet relays for use when the successive welding pulses are single half cycles of alternating polarity.

A still further object of this invention is to provide such a control which is fully electronic.

Figure 1A:
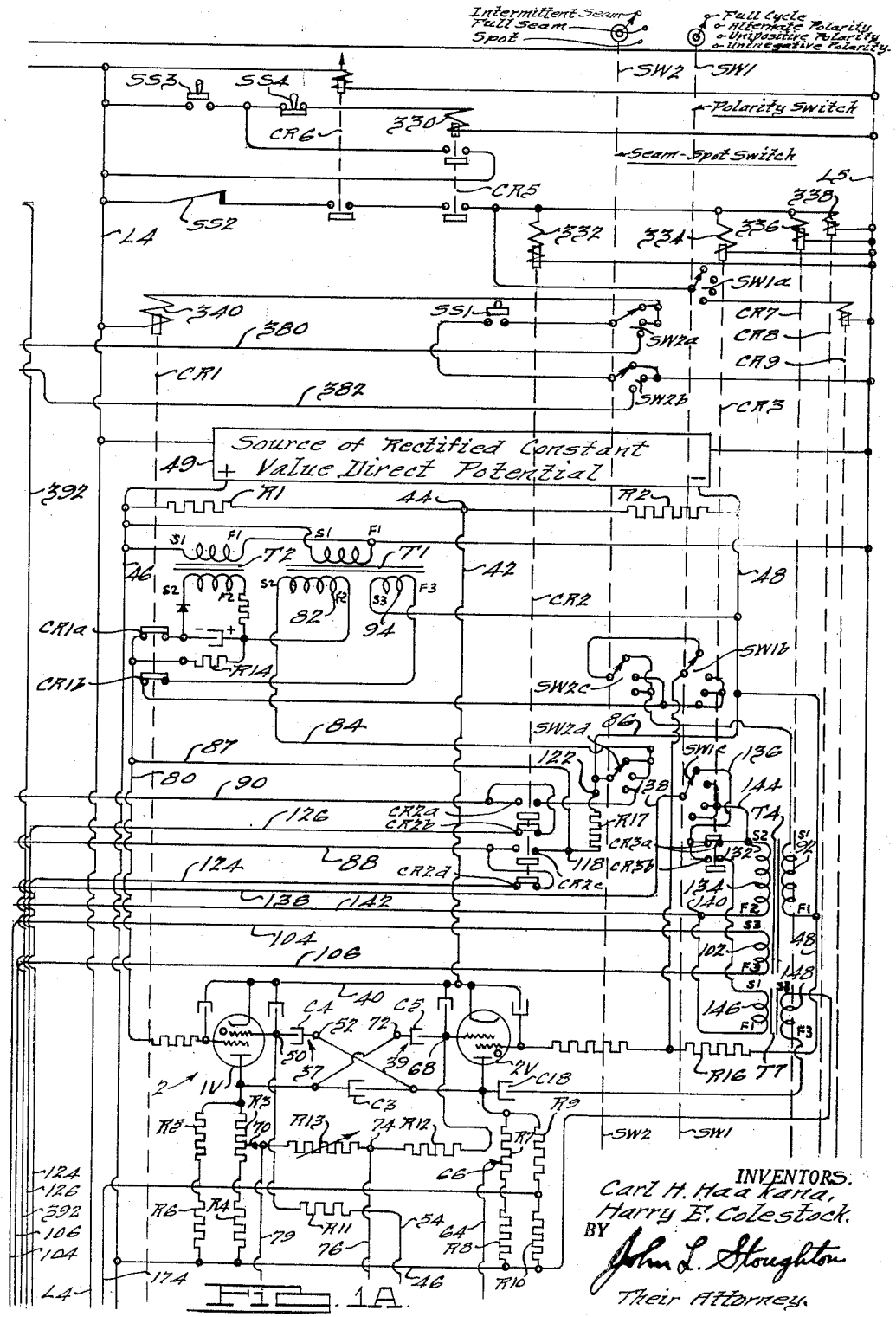
Figure 1D:
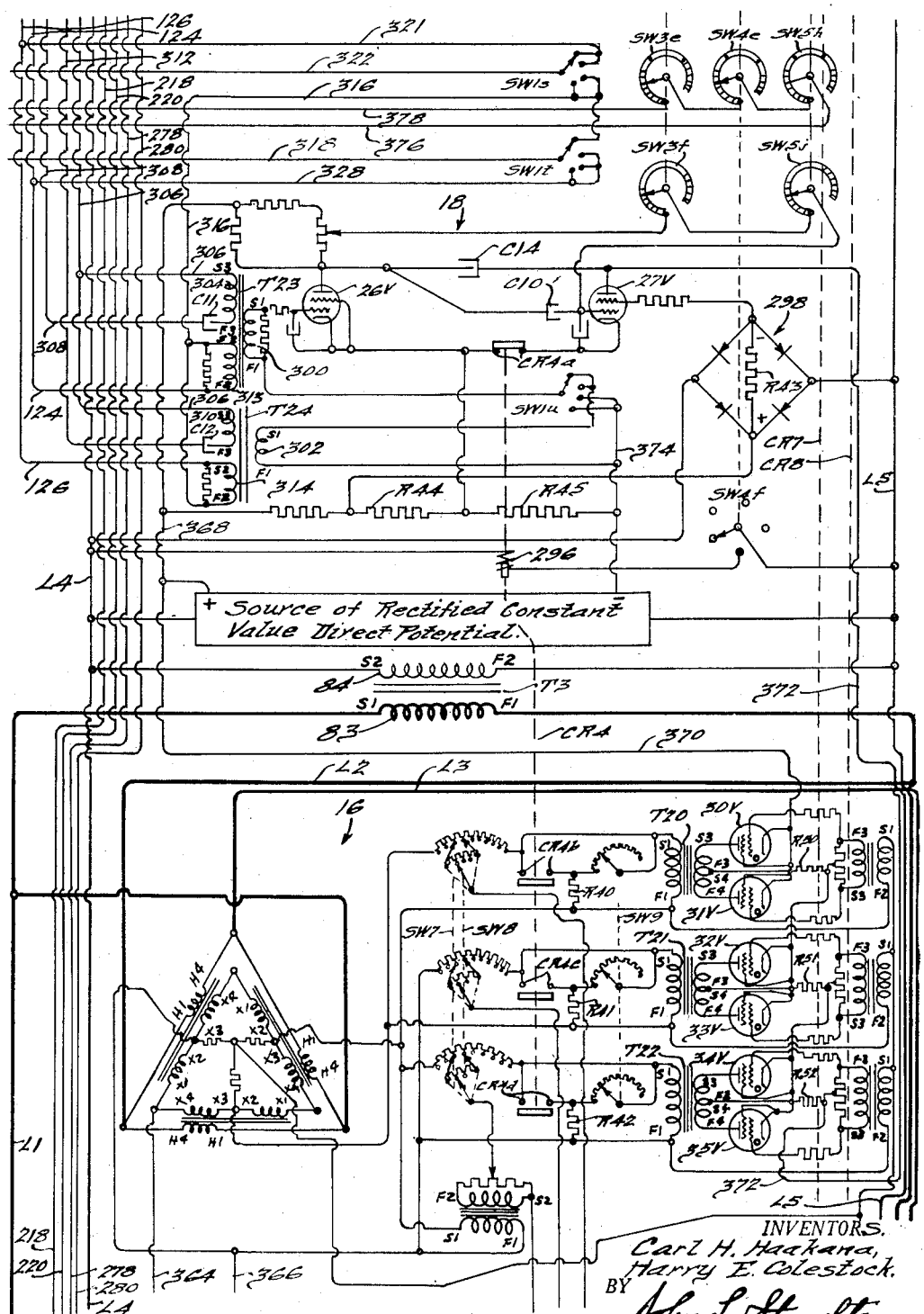

Other objects of this invention will be apparent from the following specification, the appended claims and the drawings, in which drawings Figures 1A to 1F when placed in end to end relation with each other schematically illustrate one form of network for controlling the flow of electrical energy from a polyphase source to a single phase welding load;

Figure 2 schematically illustrates a sequencing timer for establishing the Squeeze, Hold and Off times of the network when it is used to control a spot welding operation. When Figure 2 is arranged to the left of Figure 1A, its connection therewith will be apparent;

Figure 3 schematically illustrates a forge control panel and the low frequency pulsing network for use with the networks of Figures 1A–1F. When Figure 3 is placed to the left hand side of the lower portion of Figure 1C and the upper portion of Figure 1D, the connection therewith will be apparent.

In accordance with this invention a single phase load, which generically may be of any of various types but which is described specifically as resistance welding electrodes of a welding machine, is supplied from a source of polyphase electrical energy which is illustrated as being of the common three phase variety but which could comprise other number of phases depending upon the type of electrical power available. The type of and duration of energy pulses which are supplied to the electrodes is controlled by the four-position switch SW1 and the three-position switch SW2.

The switch SW1 has four operating positions by which the energy supplied to the welding electrodes in response to each operation of the start switch SS1 appears as (1) a series of half cycles of alternating polarity (referred to hereinafter as full cycle and occurs with the switch SW1 in its No. 1 position), (2) a single pulse or half cycle of energy the polarity of which alternates each subsequent operation of the start switch SS1 (referred to hereinafter as alternate polarity and occurs with the switch SW1 in its No. 2 position), and (3) a single pulse or half cycle of energy the polarity of which is the same for subsequent operations of the start switch SS1 and occurs when the switch SW1 is in either its third or fourth positions. When the switch SW1 is set in its third position, the half cycles are in a first polarity referred to as unipositive and when this switch is in its fourth position the half cycles are in the opposite polarity and referred to as uninegative.

The switch SW2 has three operating positions. In the first and second positions the energy is supplied to the electrodes for seam welding and continues to flow for as long as the start switch SS1 is held closed. In the first position the energy is supplied as a series of energy pulses known as "heat time" in which each "heat time" is followed by a period in which no energy flows, known as "cool time." This type of operation will be referred to as intermittent or pulsation seam welding. In the second position, the energy is continuously supplied and is referred to as full or continuous seam welding. In the third position, the energy is supplied to the electrodes for spot welding in which there is provided the usual spot welding sequence steps of squeeze, weld, hold and off.

The control combination comprises a first timing network which, in full cycle spot welding operation, acts to time the duration of the current flow to the welding electrodes E. In alternate polarity and unipolarity plus or minus operation the network 2 is adjusted to time out at least by the end of, and preferably prior to, the completion of the half cycle energy pulse to the welding electrodes E.

In continuous seam operation, the network 2 is deprived of its timing function and is merely actuated to maintain thyratron 1V conducting and thyratron 2V blocked as long as the initiating or start switch SS1 is maintained closed. Upon opening of the start switch SS1 the thyratron 2V reconducts to terminate the flow of welding energy in response to an initiating pulse derived from the source voltage.

In intermittent seam welding operation at full cycle, the timing network 2 acts to control the duration of the heat flow and the intervening off time periods. In alternate polarity and unipolarity the timing network 2 acts the same as in continuous seam operation at like settings of the polarity switch.

The network 4 comprises a pair of thyratrons 3V and 4V and is arranged so that during the periods in which the thyratron 2V of the network 2 is held blocked or in a nonconducting condition at least one of the thyratrons 3V or 4V will conduct to initiate a positive or a negative half cycle of current flow to the electrodes. In full cycle operation, the network 4 acts as a multivibrator in which the thyratrons 3V and 4V continue to conduct alternately in timed relation (as generally determined by the timing circuits 5 and 7) thereby providing for a continuous series of simulated positive and negative half cycles of current to the welding electrodes E or a simulated full wave single phase energization of the welding electrodes E. In half cycle operation either of the alternate polarity or unipolarity type, the network 4 will initiate solely a single half cycle of output potential between the welding electrodes E. This is accomplished by timing the thyratron 2V of the network 2 to the reconduct not later than and preferably prior to the timing out of the circuits 5 or 7, as the case may be. Consequently only a single half cycle of current will be applied to the welding electrodes E.

In full cycle and alternate polarity operation, the conduction of thyratron 3V of the network 4 will initiate the charging of a timing capacitor C1. During the time period required to charge the capacitor C1 to a critical charge, the positive interpulse timing network 6 will be effective to provide a positive half cycle of output voltage. Likewise, conduction of thyratron 4V will initiate the charging of a timing capacitor C2. During the critical charging time of capacitor C2, the negative interpulse timing network 10 will be effective to provide a negative half cycle of output voltage. In unipositive operation the control of network 6 remains as stated above but the network 10 is rendered ineffective to respond to the network 4. In uninegative operation the control of the network 6 is rendered ineffective to respond to the network 4 and the network 10 is rendered effective to respond to the charging of the capacitor C1.

After a suitable interpulse time delay, the positive interpulse timing network 6 renders the positive half cycle, phase-shifted lead and trail thyratrons of the indexing network 8 sequentially conducting. Likewise, the negative interpulse timing network 10 will, after a suitable interpulse time delay, render the negative half cycle phase-shifting lead and trail thyratrons of the indexing network 12 sequentialy conducting.

The networks 8 and 12 control the firing of the ignitrons IG1 through IG6 of the electronic contactor 14. The points in the voltage waves at which the networks 8 and 12 fire the ignitrons IG1, IG2, IG3, IG4, IG5 and IG6 are controlled by means of a three phase phase-shifting network 16. The ignitrons IG1 through IG6 are conventionally connected to control the flow of current from a suitable three phase source represented by the lines L1, L2 and L3 to the welding transformer WT. Such a connection is shown in the copending application of Lloyd C. Poole, Serial No. 214,999, filed March 10, 1951, for Electrical Control System and assigned to the same assignee as is this invention, now abandoned.

In order to provide for changing the magnitude of the current flowing to the welding electrodes, a tailing current network 18 is provided comprising the thyratrons 26V and 27V which control the conductivity of the thyratrons 30V through 35V of the network 16. These thyratrons control the amount of phase shift imparted by the phase-shifting network 16 as described in the copending application of Lloyd C. Poole, Serial No. 281,323, filed April 9, 1952, for Electrical Control System, and also assigned to the same assignee as is this invention.

The positive and negative interpulse timing networks 6 and 10 provide a time interval between the discontinuing of the flow of current from the lines L1, L2 and L3 to the welding transformer WT in one direction and the initiation of the current flow in the opposite direction. This allows time for the collapsing of the transformer flux and the consequent termination of the flow of reactive current before the current is supplied in the opposite direction.

While, in many instances, the interpulse timer alone is sufficient to permit the termination of the inductive current flow, there may be times, especially when the welding apparatus has a deep throat, that the inductive current flow will continue for more than the time period of one half cycle of source potential wave and in such event the last to fire ignitron IG3 would not have become nonconductive when the supply voltage wave between lines L3 and L1 again became positive. In such event, the ignitron IG3 would again conduct to build up flux in the transformer. This is undesirable and in order to lengthen the time period for the decay of inductive current an inverter network 20 is provided to transfer the reactive current flow from the ignitron IG3 to ignitron IG1. This results in increasing the time period to five-sixths of a cycle during which the inductive current can decay before the phase voltage is plus to minus anode to cathode at the conducting thyratron.

The ignitron IG1 is connected between lines L1 and L2 and the transfer of inductive current flow back to ignitron IG1 is accomplished by firing ignitron IG1 late in the half cycle in which line L1 is positive with respect to line L2. Because of its late firing, only a very little build up of flux occurs due to current flow from the line L2 to the transformer WT; but this transfer does, however, increase the time period for the decay of inductive current before the inductive current carrying ignitron is subjected to a complete half cycle of conducting potential.

Furthermore, the use of the inverter network 20 also makes it possible to supply a firing potential to the ignitron IG4 without any danger of magnetically shorting the supply lines since the ignitron IG4 is in back-to-back relation with the ignitron IG1. The ignitron IG4 will not, however, conduct as long as inductive current still flows through the ignitron IG1 because in such an instance the inductive voltage is then maintaining a reversed polarity across the ignitron IG4 which is greater than the line voltage between the lines L1 and L2.

The thyratron 10V not only causes the firing potential to be supplied to ignitron IG4 but also causes its trailing thyratrons 14V and 18V to fire to supply firing potential to ignitrons IG5 and IG6. For proper operation, the inductive current flow should terminate not later than five-sixths of a cycle after phase C potential has reversed from a positive to a negative potential. Therefore, sometime before ignitron IG5 is supplied with a conducting bias potential the inductive current flow will have ceased. The flow of inductive current will also be opposed by the line potential between lines L1 and L3 and whenever this potential is greater than the potential causing the flow of inductive current the ignitron IG4 will conduct and ignitron IG1 will go out and the next or negative half cycle of output current of the transformer will commence. This arrangement not only eliminates an undesirable firing of phase C to provide an unwanted continued energization of the welding transformer WT when the inductive current flow persists longer than one half cycle of the supply voltage but also results in the supplying of a potential in opposition to the inductive potential at a later time in its decaying period which is more effective to clip off the relatively lesser magnitude, but longer lasting, end portions of the asymptotic inductive current decay pattern. This arrangement also provides an automatic adjustment for changes in the decay pattern due to changes in the inductance of the work circuit caused by changes in the workpiece dimensions or otherwise. In many instances it results in an increase in the number of weld spots which may be made in any given time interval.

A low frequency pulse producing network 22 (Fig. 3) is provided for supplying a synchronizing pulse for re-establishing conduction in the thyratron 2V of the network 2. This low frequency pulse producing network is effective during full cycle spot welding operation or full cycle intermittent seam operation to provide a triggering pulse which occurs at a lower frequency than the frequency of the supply lines L1, L2 and L3 thereby rendering the precise instant at which the thyratron 2V conducts more accurate. This is especially desirable when relatively long weld current flow periods are used.

The electrodes E are merely diagrammatically shown in Fig. 1F since the specific construction thereof forms no part of this invention. Furthermore, the structure by which the electrodes are pressed against the workpiece W is not shown since it also forms no part of this invention. It is to be understood, however, that suitable electrodes and suitable ram mechanism is necessary. When the apparatus is used for seam welding operation, the electrodes E may take the form of a pair of electrically conducting wheels between which the work W moves. When the apparatus is used for spot welding, the conducting wheels may be held against rotation by suitable mechanism and in this event a suitable ram controlled by the sequencing network 24 (Fig. 2) is utilized to position the electrodes into and out of workpiece clamping position. If it is desired to use more than one electrode clamping pressure, the same may be provided by a suitable mechanism, well known in the art, operating under control of a forge delay network 26 (Fig. 3).

Each of the half cycle periods comprises three portions which are the interpulse time, the pulse time (period during which weld current flows), and the tailing time (period during which tailing current flows). The total time for a complete half cycle is controlled by the network 4, the interpulse time is controlled by the networks 6 and 10 as above set forth, and the tailing current time period is controlled by the tailing current timing network 18. In order to provide for independently adjusting these time periods, a plurality of switches SW3, SW4 and SW5 are provided, in accordance with the teachings of said Lloyd C. Poole application, Serial No. 281,323.

Referring more specifically to the details of construction, the network 2 comprises the thyratrons 1V and 2V which are interconnected so that only one thereof may conduct at any one time and so that the initiation of the conduction of one thereof will result in the immediate termination of the conduction of the other thereof. The precise instants at which the thyratrons initiate conduction are controlled by means of the bias placed between their respective shield grids and cathodes and the time period which must elapse between the instants at which the thyratrons are blocked and the time that the blocking bias is removed from their control grid is controlled by the bias placed between their respective control grids and cathodes by the basic timing circuits 37 and 39.

The thyratrons 1V and 2V have their cathodes connected to a common cathode bus 40, which in turn is connected by branch conductor 42 to a midpoint terminal 44 of a pair of voltage dividing resistors R1 and R2. These resistors are serially connected between positive and negative direct current busses 46 and 48 supplied from a suitable D. C. source such as the rectifier 49. The anode of the thyratron 1V is connected to the positive bus 46 through a resistor network comprising the series connected potentiometer R3 and resistor R4 having in parallel therewith the series connected resistors R5 and R6. The anode of the thyratron 2V is connected to the positive bus 46 through a similar resistor network comprising the potentiometer R7 and resistors R8, R9 and R10. A commutating capacitor C3 is connected between the anodes of the thyratrons 1V and 2V and acts to provide the commutating action whereby the conduction of the blocked one of the thyratrons will render the conductive one of the thyratrons blocked.

The timing networks 37 and 39 which prevent reconduction of the thyratron for a predetermined time period subsequent to its being blocked comprise the timing capacitors C4 and C5.

The discharge circuit of the timing capacitor C4 includes portions of the switches SW1 and SW2 which act to switch in and out various timing resistors. In continuous and intermittent seam welding full cycle operation (switch SW1 in its first position and switch SW2 in its first or second position) the discharge circuit extends from terminal 50 of capacitor C4 through resistor R11, conductor 54, switch section SW1e, conductors 56 and 58, switch section SW6a, conductors 60 and 62, switch section SW1d, conductor 64, adjustable tap 66 back to capacitor terminal 52. The timing then is primarily determined by the magnitude of the resistance afforded by the switch section SW6a. In intermittent seam operation this regulates the "cool time" between successive "heat times." This same general circuit is utilized in the alternate polarity and unipolarity positions but in these instances a resistor R11a of fixed value is connected in place of the switch section SW6a and controls the timing out of the capacitor C4. Resistor R11a is of small value and quickly times out the capacitor C4. In spot welding operation, substantially the same discharge circuit is also used. In the case of spot welding full cycle operation, the timing of this discharge circuit is not utilized. The switch section SW6a remains connected, but a resistor R11b is connected in parallel therewith and this circuit rapidly times out. In spot welding alternate polarity and unipolarity positions, the discharge circuit includes both the resistors R11a and R11b connected in parallel but does not include the switch section SW6a. This also provides for a rapid timing out of the capacitor C4.

The discharge circuit of the timing capacitor C5 extends from the terminal 68 thereof (connected to the grid of thyratron 2V) through resistors R12 and R13 and adjustable tap 70 of potentiometer resistor R3 back to the other terminal 72 of the capacitor C5. A shunting circuit for the resistor R13 extends from the terminal 74, through conductor 76, switch sections SW1f and SW2f, conductor 78, normally closed contacts CR1c, conductor 79 to the tap 70. In intermittent seam and continuous seam operation, irrespective of the setting of the polarity switch SW1, this shunting circuit is open circuited during a welding operation because of the then energized condition of the relay CR1, as will be described below. At the end of a seaming operation the shunt circuit does act to promptly discharge capacitor C5 to end the weld interval. The timing of the off period of thyratron 2V is primarily determined by the setting of the resistor R13. In intermittent seam operation this timing controls the "heat time." In full seam operation the timing afforded by the resistor R13 is not used since, as will also be explained below, the thyratron 2V cannot reconduct even after the capacitor C5 times out until the relay CR1 is de-energized.

In spot welding full cycle operation, the shunt circuit around resistor R13 is also open and the value of resistor R13 controls "weld time." Since "heat time" in intermittent seam operation and "weld time" in spot operation are both in the same range, a single variable resistor R13 may be used for both. In spot welding alternate polarity operation, the switch section SW1f completes the shunting circuit and capacitor C5 rapidly times out. As will be explained in greater detail below, this provides for the reconduction of thyratron 2V before the end of the shortest one half cycle for which the network 4 may be adjusted.

The shield grid of the thyratron 1V is connected by conductor 80 through a biasing resistor R14, the secondary winding 82 of a transformer T1, and a conductor 84 to the first and second contacts of switch section SW2d. The contact arm of switch section SW2d is connected by conductor 86 to the negative bus 48. A branch conductor 87 of conductor 80 is connected to one terminal 118 of a resistor R17 and the other terminal 122 of this resistor is connected to the conductor 86. The bias between the shield grid and cathode of thyratron 1V, with the control relay CR1 de-energized and the switch SW2 in its first or second position, will be determined by the voltage appearing across the resistor R14, the winding 82, and the resistor R2. The sum of the voltages appearing across the resistors R2 and R14 are of a polarity and magnitude to maintain the thyratron 1V blocked irrespective of the peaked positive potential which is developed in the winding 82. When the relay CR1 is energized its contacts CR1a open and the resistor R14 is no longer effective to overcome the positive peaks supplied by the winding 82 and the thyratron 1V will commence to conduct at the next positive peak of winding 82, if at such time the timing capacitor C2 has timed out. With the switch SW2 in its third position, the part of the circuit through the resistor R14 and peaking winding 82 is open circuited and the resistor R17 is connected between conductors 88 and 90 which are connected to be energized by a transformer T5 located in the sequencing network 24. Under these conditions, the precise instant at which thyratron 1V conducts is determined by the initiation of conduction of thyratron 64V.

The shield grid of the thyratron 2V is connected through a resistor R16, negative bus 48, resistor R2 and conductors 42 and 40 to the cathode of thyratron 2V and the bias will be the algebraic sum of the potentials across the resistors R2 and R16. The energization of the resistor R16 is controlled by either a secondary winding 92 of a pulse transformer T4 or a secondary winding 94 of the peaking transformer T1 depending on the positioning of switches SW1 and SW2.

With the switch SW2 in its first or second position, a start switch SS1 is operable to control the energization and de-energization of the relay CR1 through a control circuit which extends between a pair of alternating current energized lines L4 and L5. The lines L4 and L5 obtain their potential from the secondary winding 84 of a control transformer T3 (Fig. 1D) having its primary winding 83 connected between the supply lines L1 and L2. Upon the closure of the start switch SS1 the relay CR1 is energized and opens its contacts CR1a thereby causing the thyratron 1V to conduct upon the occurrence of the next positive peak produced by the winding 82 of the peaking transformer T1.

When the switch SW1 is in its first (full cycle) position and switch SW2 is in either its first (intermittent seam) position or its third (spot) position, the energization of the resistor R16 is under the control of transformer T4 which is pulsed from the low frequency pulse producing network 22. In all other operating positions of the switches SW1 and SW2 the pulses for rendering the shield grid at a conducting bias with respect to the cathode are produced by the winding 94 of the peaking transformer T1. It will be observed that, under continuous seam operation, the relay CR1 is held energized as long as switch SS1 is held closed. The contacts CR1b will consequently remain open while the switch SS1 is closed. With the contacts CR1b open the thyratron 2V cannot reconduct and consequently the thyratron 1V will conduct continuously and welding current will be supplied to the electrodes E as long as the switch SS1 is held closed.

The weld-no weld switch SS2 controls the energization of relay CR3 and when closed maintains the relay CR3 energized. When energized it holds its contacts CR3b closed to connect the winding 146 of transformer T7 through conductors 138 and 142 to actuate the sequencing network 24 to start "hold time" as a consequence of the reinitiation of conduction of the thyratron 2V during full cycle operation. In the other types of spot operation (alternate polarity and unipolarity) the switch SW2 will be in its second, third or fourth positions and the pulse for initiating the "hold time" function is derived from the secondary winding 134 of transformer T4. As discussed, the primary winding 102 of this transformer T4 is pulsed as a consequence of the initiation of conduction of thyratron 41V of the low frequency pulse producing network 22.

With the weld-no weld switch SS2 open for no-weld operation relay CR2 will be de-energized and the conductors 88 and 90 are connected through the normally closed contacts CR2b and CR2d to the conductors 124 and 126 respectively. These conductors extend through Figs. 1B and 1C to the transformer T32 located in the forge delay network 26 shown in Fig. 3 and through circuits to be described below to initiate operation of the low frequency pulse producing network 22. With this arrangement, the sequence network 24 will not fire the thyratron 1V and the subsequent networks 4, 6, 8, 12, and 14 will not be actuated to cause welding current to flow. Instead, the sequencing network 24 will actuate the forge delay network 26 and the low frequency pulse producing network 22. Actuation of the forge delay network 26 causes it to perform its function of increasing the pressure at which the electrodes E are urged against the work W and the operation thereof may be observed. The low frequency pulse producing network 22 will, after the desired time delay, initiate operation of the sequence network 24 to perform its functions of "hold" and "off." This arrangement is particularly desirable when the switch SW2 is set in its second or alternate polarity position since it insures against two subsequent energizations of the welding transformer in the same polarity which might otherwise occur should the polarity controlling network 4 be left in the opposite condition from that at which it was left at the end of the last energy pulse to the welding transformer.

More specifically, one terminal 132 of secondary winding 134 of the transformer T4 is connected to the first contact of the switch section SW1c by a conductor 136 through contacts CR3a of relay CR3. The contact arm of the switch section SW1c is connected by conductor 138 to the grid of thyratron 65V of the sequencing network 24, the other terminal 140 of the winding 134 is connected by conductor 142 to the cathode of the thyratron 65V. The terminal 132 of winding 134 is connected by conductor 144 to the second, third and fourth contacts of the switch section SW1c. In no-weld operation, the pulse produced by the low frequency pulse producing network 22 will be effective to render the thyratron 65V conducting irrespective of the setting of the switch SW1. As will be described below, this pulse permits the sequencing network 24 to continue its function of timing "hold" and "off."

The relay CR3 is energized in the weld position of the switch SS2 to open its normally closed contacts CR3a and close its normally open contacts CR3b. The contacts CR3b connect the secondary winding 146 of a pulse transformer T7 between the conductor 142 and the first contact of the switch section SW1c, whereby energization of the transformer T7 under full cycle operation will be effective to supply an energizing pulse to the thyratron 65V. The primary winding 148 of the transformer T7 is connected across the anode resistor network of the thyratron 2V through a capacitor C18 arranged in series with the winding 148 to provide for a pulse type of energization of the transformer T7 in response to the initiation of conduction of thyratron 2V. Therefore, in full cycle operation, conduction of the thyratron 2V at the end of the weld time interval, initiates the sequence timer functions of "hold" and "off."

In many respects, the multivibrator network 4 is similar to the described weld timing network 2 and is provided with basic timing circuits 5 and 7 controlling the bias potential between the control grids and cathodes of the thyratrons 3V and 4V and pulsing or triggering circuits controlling the bias potential between the shield grids and cathodes of these thyratrons. The network 4, as described above, controls the duration of any individual half cycle of output potential. In full cycle operation it operates to successively provide a positive half cycle which is always followed by a negative half cycle and continues to provide positive and negative half cycles for as long as the thyratron 2V of network 2 remains blocked. In alternate polarity and unipolarity operation, it will provide for a single half cycle of potential to the welding electrodes E.

More specifically, the network 4 comprises the thyratrons 3V and 4V having anode resistor networks 150 and 152 respectively. The network 150 includes a potentiometer resistor R19 which is comparable to the potentiometer resistor R3 and which has an adjustable arm 154. Likewise, the network 152 comprises a potentiometer resistor R21 comparable to the potentiometer resistor R7 and which has an adjustable arm 158.

In full cycle operation, the timing afforded by the capacitors C6 and C7 of the basic timing circuits 5 and 7 will be controlled by the total resistance of the resistors inserted into their respective discharging circuits.

The discharge circuit for the capacitor C7 extends from its terminal 159 (connected to the grid of thyratron 4V) through conductor 155, resistors R20 and R20a, switch sections SW6b, SW3a, SW4a and SW5a, conductor 156, adjustable tap 154 and conductor 156a to the other terminal of the capacitor C7. By means of the switch sections SW1h, SW1j, SW2h and SW2j various combinations of resistance switch sections SW3a, SW4a, SW5a, and SW6b as well as resistor R20 may be made as explained below.

In intermittent and continuous seam full cycle, the switch section SW1j shunts out the resistor R20 and switch section SW6b whereby the timing is equivalent to the sum of the pulse time (section SW3a), tailing time (section SW4a), and interpulse time (section SW5a) as determined by the magnitude of the resistance of these sections. This magnitude is adjustably controlled in steps by the adjustment of the switches SW3, SW4, and SW5. These same switch sections are employed for the unipolarity positions of seam welding. In the case of alternate polarity position of switch SW2, the shunt circuit through section SW1j is open and the extra timing afforded by the resistor R20 and section SW6b is used. This extra time increment, as will be made clear below, provides for a "cool time" following the "heat time" which in intermittent seam alternate polarity operation must occur during a conducting period of the thyratron V. In intermittent seam full cycle operation, the "cool time" and "heat time" periods are regulated by the conductive periods of thyratrons 2V and 1V. In unipositive and uninegative operation the "cool time" period is measured by the conductive periods of thyratron 4V which occurs prior to the capacitor C2 receiving its critical charge.

In seam full cycle operation, the switch section SW2j completes the shunting circuit about the resistor R20 and section SW6b and the timing of the discharge of capacitor C7 is like that described above. In spot unipositive and uninegative, the resistor R20 and section SW6b are likewise shunted by the same switch section SW2j. In seam alternate polarity, the circuit through the resistors R20a and R20 and switch sections SW6b, SW3a, SW4a and SW5a is opened and a discharge circuit through resistor R24 is provided by switch sections SW1h and SW2h. The value of resistor R24 is sufficient to insure that the timing of capacitor C7 is longer than any half cycle of energization of the welding transformer WT.

The discharge circuit for capacitor C7 is similarly controlled by the switch sections SW3b, SW4b, and SW5b and resistors R22 and R26. In intermittent seam, continuous seam and spot welding operation at full cycle polarity the discharge circuit extends from the terminal 165 through conductor 166, switch sections SW2k, resistor R22, switch sections SW3b, SW4b, and SW5b, conductor 160, switch sections SW1n and SW1o and adjustable tap 158 back to the other terminal of capacitor C6. With this arrangement, the timing is primarily determined by the setting of the pulse time switch SW3, the tailing time switch SW4 and the interpulse timing switch SW5. These sections adjust the time so that it is the sum of these individual time periods.

In intermittent seam or continuous seam alternate polarity operation, a fixed resistor R22a and the previously mentioned switch section SW6a are additively inserted in series with the described discharge circuit and add thereto a time interval equal to the desired "cool time" which under these conditions is timed by network 4 rather than network 2. In unipositive and uninegative the timing afforded by the capacitor C6 is not utilized since under these conditions all of the timing is done by the capacitor C7 of network 7. Therefore to insure a prompt timing out, the sections SW3b, SW4b, and SW5b are shorted out through switch sections SW1m and SW1n but the section SW6a is still utilized.

In spot alternate polarity welding the resistor R26 is connected in place of the resistor R22 and switch sections SW3b, SW4b, and SW5b by means of the switch sections SW2k and SW1k. The value of this resistor R26, like resistor R24, is sufficient to delay the firing of the thyratron 4V for a period not less than, and preferably somewhat greater than, the maximum length of any half cycle output of transformer WT. In spot uninegative and unipositive welding, the discharge circuit for the capacitor C7 is the same as that in intermittent and continuous seam unipolarity operation.

The precise instant at which the thyratrons 3V and 4V conduct is determined by the shield grid to cathode bias thereof. In order to provide a normal negative bias on the shield grids, the cathodes of the thyratrons 3V and 4V are connected to a common cathode bus 162 which is maintained at a potential slightly above that of the negative direct current supplying bus 170 due to the voltage dividing action of the resistors R28 and R28a. The screen grid of the thyratron 3V is connected through one secondary winding 172 of a peaking transformer T8 and a conductor 174 to the common terminal between the resistors R9 and R10 of the anode resistor network for the thyratron 2V. The grid of the thyratron 3V is connected through the biasing resistor R28, the negative bus 170, and a conductor 176 to the free end of the resistor R10. When the thyratron 2V is conducting and the resistor R10 is energized, a negative screen grid to cathode bias voltage will be established by resistors R10 and R28 which is sufficient to override the positive conducting pulses being periodically supplied from the winding 172 of the peaking transformer T8. When the thyratron 2V is blocked and the drop across the resistor R10 disappears, the positive pulse of the winding 172 is sufficient to override the negative bias of resistor R28 and the thyratron 3V will be triggered to conduct at the next subsequent positive pulse furnished by the transformer T8. Likewise, the screen grid of the thyratron 4V is connected through conductor 180, a second secondary winding 182 of the transformer T8, and the switch sections SW2g and/or SW1g to the conductor 170. The winding 182 is arranged to supply its positive pulse during the opposite half cycle to that of the winding 172.

With the switch section SW2g set for intermittent seam or continuous seam, the winding 182 of peaking transformer T8 is directly connected between the shield grid and cathode of the thyratron 4V in series with the biasing resistor R28 whereby the shield grid to cathode bias potential will be rendered in an unblocking condition once each cycle of the source frequency. In spot full cycle welding operation, a similar condition will exist since the switch arm of the switch section SW2g will be connected through the switch section SW1g to the bus 170. This same holds true for the unipolarity operation.

In the alternate polarity operation, the switch section SW1g will be in its second position and the shield grid to cathode biasing circuit for the thyratron 4V will have inserted therein the potential established by the resistor R28 and the potential established across the resistor R10 (due to the conduction of the thyratron 2V) which will prevent the periodic pulses supplied by winding 182 from triggering thyratron 4V. When the thyratron 2V is blocked, the resistor R10 will be de-energized, the transformer T8 will supply an unblocking bias potential pulse between the shield grid and cathode of the thyratron 4V as well as to the thyratron 3V. The timing afforded by the network 2 during alternate polarity operation is less than the timing afforded by the timing circuits 5 and 7 of network 4 and consequently for each operation of the network 2, the conductive condition of the thyratrons 3V and 4V will be reversed and will remain that way until the next operation of network 2.

If at the time the winding 172 supplies this unblocking bias potential pulse, the thyratron 3V is conducting, the pulse supplied thereby is without effect. However, on the next succeeding half cycle the winding 182 will supply an unblocking bias potential pulse between the screen grid and cathode of the thyratron 4V and this thyratron will then conduct and blow out thyratron 3V and vice versa. The pulses supplied by the winding 172 will continue at the frequency of the energization of the transformer T8 as long as thyratron 2V is blocked but they are without effect since the thyratron 3V cannot conduct because it is being held blocked by the bias potential appearing across the capacitor C6. As stated above, the value of the resistors R24 and R25 controlling the discharge of the capacitors C7 and C6 are so chosen that the capacitors C7 and C6 can not time out prior to timing out of the capacitor C5. Therefore, prior to the timing out of the capacitor C6 or C7, whichever the case may be, the blocking potential will be re-established across the resistor R10 and the windings 172 or 182 are ineffective to supply positive pulses to the thyratrons 3V and 4V and the one of the thyratrons 3V or 4V which was just rendered conducting will remain conducting and the other of the thyratrons 4V or 3V will remain blocked irrespective of the subsequent timing out of the circuits 5 or 7.

The interpulse timing networks 6 and 10 are each substantially identical with the exception that the thyratrons 5V and 7V of the network 6 are connected to conduct current during the opposite half cycle of their corresponding thyratrons 6V and 8V of the network 10. These networks are similar to the corresponding networks 22 of the said Poole application, Serial No. 214,999, which includes thyratrons 5V, 6V, 7V and 8V and which are more completely described therein. Generally, the anode-cathode circuits for these thyratrons 5V, 6V, 7V and 8V are supplied from a transformer T10 having its primary connected between the lines L4 and L5. One secondary winding 186 supplies the anode-cathode potential for the thyratrons 5V and 7V and the other winding 188 supplies the thyratrons 6V and 8V. The thyratrons 5V and 7V and the thyratrons 6V and 8V are each paired to conduct during opposite half cycles of the potential supplied thereto from the respective windings 186 and 188. The thyratrons 5V and 6V are normally conducting and when conducting establish a potential across their respective anode timing circuits 190 and 192. The potential across the circuits 190 and 192 are applied respectively between the grid and cathode of the thyratrons 7V and 8V and normally maintain these thyratrons blocked, so that the transformers T11 and T12 in their respective anode circuits are normally maintained de-energized. In order to insure that the thyratrons 7V and 8V, if they conduct at all, will conduct at an early portion in the voltage cycle between their respective anodes and cathodes, clipping circuits 194 and 196 are individually arranged in series with the bias potentials derived from the circuits 190 and 192. These clipping circuits are energized from a transformer T10a having one of its secondary windings energizing the clipping circuit 194 and the other secondary winding energizing the clipping circuit 196. Upon being blocked, the thyratrons 5V and 6V will initiate a discharge of their respective timing circuits and at the end of the time period required to discharge their respective timing capacitors to a critical low value, as determined by the setting of the respective switch sections SW5f and SW5e of the interpulse timing adjustment switch SW5, will cause the respective normally blocked thyratrons 7V and 8V to conduct. The thyratrons 7V and 8V upon being rendered conducting will of course then energize their respective anode transformer T11 or T12.

The bias for controlling the thyratrons 5V and 7V is derived from the network 4. In full cycle and alternate polarity operation, the bias will be present and be removed in accordance with the presence of or absence of a flow of charging current required to raise the charged condition of the capacitor C1 of the network 4 to a critical value. Likewise, the bias for the thyratron 7V is controlled by the flow of charging current to the capacitor C2. In unipositive operation, the switch section SW1b disconnects the biasing circuit of the thyratron 6V from the network 4 so that irrespective of the conductive condition of thyratron 4V the thyratron 6V will remain conductive. In uninegative operation, the switch section SW1r disconnects the biasing circuit of the thyratron 5V from the network 4 so that irrespective of the conductive condition of thyratron 3V the thyratron 5V will remain conductive and the switch section SW1p connects the biasing circuit to respond to the charging condition of capacitor C1. In this latter instance, the switch section SW1a completes the energizing circuit for relay CR3 which, when energized, effects a reconnection of transformer T8 (Fig. 1B) whereby the half cycles at which thyratrons 3V and 4V are rendered conducting are reversed. This properly orientates the firing of thyratron 3V for initiating the negative half cycle.

More specifically, the cathode of the thyratron 5V is connected through a conductor 198, an intermediate terminal 200 of a pair of voltage dividing resistors R29 and R30 connected between the negative bus 170 and the positive bus 202, resistor R29, bus 202, a conductor 204, switch sections SW3d, SW4d, and SW5d, a conductor 206, a resistor R31, a terminal 207 thereof, a conductor 208, switch section SW1r, and a conductor 210 to the grid of thyratron 5V. The terminal 207 of the resistor R31 is connected to one terminal of a timing capacitor C1 having its other terminal connected to an adjustable contact 212 of a potentiometer resistor R32. The resistor R32 corresponds to the resistor R5 of the network 2. The resistor R31 and the switch sections SW3d, SW4d, and SW5d are connected in series with the capacitor C1 between the adjustable arm 212 of the potentiometer resistor R32 and the positive bus 202. Therefore, when the thyratron 3V commences to conduct, a potential will be maintained across this last-named resistor R31 and switch sections SW3d, SW5d and SW6d which will be proportional to the charging current supplied to the capacitor C1. Prior to the charge on the capacitor C1 reaching a critical value, this drop across the just-mentioned series circuit will be sufficient to place a blocking bias potential between the grid and cathode of the thyratron 5V whereby this thyratron is maintained blocked. Capacitor C2 is similarly arranged for charging through switch sections SW3c, SW4c and SW5c and resistor R31a to provide a control bias which in full cycle or alternate polarity position of the switch SW1 will be effective to control the bias on thyratron 6V. This also makes it possible for thyratron 4V to remain conducting during standby condition without a consequent actuation of the interpulse network 10.

The capacitors C1 and C2 are provided with discharge circuits which include the diodes 214 and 215 respectively. These diodes act, when the respective thyratrons 3V and 4V are blocked, to insure a prompt discharge of the respective capacitors C1 and C2 to insure that they are properly discharged to prepare them for a subsequent timing operation. A predetermined time after blocking of the thyratron 5V, depending upon the discharge characteristics of the network 190, the thyratron 7V will commence to conduct at the start of a half cycle and will remain conducting as long as the thyratron 5V remains blocked. Under full cycle, alternate polarity and unipositive operation, the reaching of a critical charge in the capacitor C7 results in a decrease in the potential drop across the charging circuit to a value which is not sufficient to block the thyratron 5V. Thyratron 5V then reconducts to block thyratron 7V to terminate the energization of transformer T11. The thyratrons 6V and 8V are similarly controlled in full cycle and alternate polarity operation by the potential drop caused by the flow of charging current to the capacitor C2. In uninegative operation, the thyratrons 6V and 8V will be controlled by the charging current flowing to the capacitor C1.

In full cycle, unipositive, and uninegative operation the time required to charge the capacitor C1 to its critical value is preferably arranged to substantially correspond with the conducting time period of the thyratron 3V. Similarly in full cycle operation the time required to charge the capacitor C2 to its critical value is substantially the same as that of the conducting periods of thyratron 4V when the network 4 is multivibrating. In alternate polarity operation the conducting periods of the thyratrons 3V and 4V are lengthened, as described above. The charging times of the capacitors C1 and C2 remains the same and the degree to which the time periods are lengthened, in intermittent seam operation, provides for the length of the "cool period." In spot alternate polarity operation, once the thyratron 3V or 4V, as the case may be, conducts its will continue to conduct until the next operation of the sequence network 24 which is an indeterminate time. Also during standby condition of the combination in full cycle, unipositive and uninegative operation, the thyratron 4V is normally conducting. In these last instances, the continued conduction thereof is not effective to continue the blocking of the respective interpulse timing network. The predetermined time interval controlling the rate at which the capacitors C1 and C2 reach their critical charge depends primarily upon the adjustment of the switches SW3, SW4, and SW5 and is equal to the sum of pulse time, interpulse time, and tailing time.

The secondary winding 216 of the transformer T11 is connected by means of the conductors 218 and 220 across a biasing network 222 through a half wave rectifier 224. The thyratrons 9V, 13V and 17V are normally maintained nonconductive due to the blocking potentials applied between their grids and cathodes from the potential established across a resistor R33 (Fig. 10) energized from a full wave rectifying network 226. More specifically, the network 226 has its alternately current input terminals 228 and 230 connected respectively between the lines L4 and L5, and direct current output terminals 232 and 234 connected together by means of a pair of series connected resistors R34 and R33 having a common terminal 236. A capacitor C9 is connected in parallel with the resistors R33 and R34 to provide a substantially constant direct current potential between the terminals 232 and 234. A conductor 238 connected to terminal 236 is connected through resistor R35 of the network 222 and a current limiting resistor to the controlling grid of the thyratron 9V, and also through resistor R36 and current limiting resistor to the grid of the thyratron 13V, and further through resistor R37 and current limiting resistor to the grid of the thyratron 17V. The other terminal 234 of the network 236 is connected by conductor 240 directly to the cathodes of the thyratrons 9V, 13V and 17V. Upon conduction of the thyratron 7V and consequent energization of the transformer T11, the blocking bias provided by the resistor R33 will be overcome and a conducting bias will be established between the grid and cathode of the thyratron 9V which will then conduct when the proper anode to cathode voltage is established by the phase-shifting network 16.

The primary winding 242 of a transformer T13 is connected in series with the anode of the thyratron 9V and is energized upon conduction thereof. Upon energization of the transformer T13, its secondary winding 244 renders the thyratron 11V conducting. The transformer T13 also has a second secondary winding 246 which is connected in series with a rectifier 248 across the resistor R36 to establish a potential across R36 which will override the normal blocking bias voltage of resistor R33 and establish a conducting bias voltage on the thyratron 13V to permit this thyratron to conduct under control of the phase-shifting network 16. A transformer T14 has its primary winding 250 connected in series with the anode of the thyratron 13V so that upon conduction of the thyratron 13V its secondary winding 252 will override the normal blocking voltage on the thyratron 15V to cause conduction of this thyratron. The transformer T14, like the transformer T13, has a second secondary winding 254 which is connected across the resistor R37 in series with a rectifier 256 so that upon energization it will establish a voltage across R37 which will override the normal blocking bias voltage of resistor R33 and establish a conducting bias voltage on the thyratron 17V. A transformer T15 has its primary winding 258 connected in series with the anode of the thyratron 17V so that upon conduction of the thyratron 17V its secondary winding 260 will override the negative blocking bias voltage potential on the thyratron 19V.

The transformer T15 has a second secondary winding 262 which is arranged to control the conductivity of the thyratron 36V which, as will be described more fully below, will become conducting to energize the primary winding 264 of a transformer T16 having its secondary winding 266 connected by conductors 268 and 270 to energize a resistor R38 connected in the control circuit of the thyratron 11V. The action of the thyratron 36V is such that the transformer T16 is energized to supply a conducting bias potential to the thyratron 11V late in the voltage wave during which the ignitron IG1 is capable of conducting. This potential is without effect during such half cycles in which the thyratron 9V has previously been rendered conducting by the aforesaid action of the thyratron 7V. If, however, this action occurred during the next succeeding such voltage wave after the thyratrons 7V and 9V have been blocked, then the ignitron IG1 will be fired to conduct the inductive current flowing in the transformer WT due to the collapse of flux therein for the purposes set forth above.

The thyratrons 10V, 11V and 18V are normally maintained nonconductive by bias potentials set up across the networks 272, 274 and 276. The networks 272 and 274 are energized from secondary windings of a transformer T17, the primary winding whereof is directly connected between the lines L4 and L5. The network 276 is energized from a secondary winding of a transformer T18 which has its primary winding connected between the lines L4 and L5. If desired, a single transformer with three secondary windings could be used.

The secondary winding of transformer T12 of the interpulse timing network 10 is connected by means of conductors 278 and 280 across a resistor 282 of a biasing controlling network 284, through a half wave rectifier 286. Therefore, upon conduction of the thyratron 8V and consequent energization of the transformer T12, a conducting bias voltage will be established between the grid and cathode of the thyratron 10V to render this thyratron conductive. The thyratrons 10V, 14V and 18V are connected together for sequential operation and for actuating respectively the thyratrons 12V, 16V, 20V and 37V in substantially the same manner as the thyratrons 9V, 13V, 17V, 11V, 15V, 19V and 36V except that each of these last named thyratrons are arranged to be actuated during the opposite half cycle of the voltage appearing across the lines L1, L2, and L3. The thyratrons 10V, 14V and 18V are respectively connected in anti-parallel relationship with the thyratrons 9V, 13V and 17V across the output voltage of the phase-shifting network 16.

The primary winding 288 of a transformer T19 (Fig. 1E) is connected in series with the anode of the thyratron 37V similarly to the connection of the transformer T16 and the thyratron 36V. The secondary winding 290 of the transformer T19 is connected by conductors 292 and 294 in series with a resistor R39 arranged in the control circuit of the thyratron 12V. The thyratron 37V due to the phase of its anode potential, is arranged to conduct late in the conducting half cycle of voltage across the ignitron IG4. This potential supplied by the transformer T19 is without effect to fire ignitron IG4 if the thyratron 10V is conducting. However, if this action occurs during the next half cycle following that in which the thyratron 10V conducted, the ignitron IG4 will be rendered conducting by this pulse late in the half cycle of the conducting voltage applied across the ignitron IG4 to render it conductive to conduct the inductive current flowing due to the decay of flux of the welding transformer WT.

The particular instant in the voltage cycle of the lines L1, L2 and L3 that the thyratrons 9V, 13V and 17V, and thyratrons 10V, 14V and 18V can conduct is determined by means of the three phase phase-shifting network 16, as determined by the setting of the switches SW7, SW8 and SW9 and the conductivity of the thyratrons 30V—35V. A detailed description of the manner in which this phase-shifting network operates may be found in the said Poole application, Serial No. 281,323. For the purposes of this application, it is sufficient to observe that the phase of the output voltage thereof with respect to the input voltage is determined by means of the coarse and fine phase adjusting switches SW7 and SW8. The phase of the tailing current may be adjusted by means of the switch SW9. When full welding current is desired, the thyratrons 30V—35V are rendered conducting to reduce the impedance afforded by their associated transformers T20, T21, and T22. When tailing current is desired, the thyratrons 30V—35V are blocked to place a high impedance across the transformers T20, T21, and T22, whereby the phase shift of the output voltage is a fraction of the welding voltage as determined by the setting of the switch SW9.

If no tailing current is desired, the switch SW9 is set in its minimum resistance position, leaving in the circuit only the impedance afforded by the resistors R40, R41 and R42. This impedance is chosen to substantially match that afforded by the transformers T20, T21 and T22 with the thyratrons 30V—35V fully conductive. With this arrangement, a tailing current-no tailing current relay CR4 may be provided having normally open contacts in shunt with the resistor sections of the switch SW9. The relay CR4 is used to short out the resistor sections of the switch SW9 when no tailing current is desired and thereby makes it unnecessary to adjust the switch SW9.

The energizing winding 296 of relay CR4 is connected between the lines L4 and L5 through the switch section SW4f. When the tailing current control switch SW4 is set in its first or no-tailing current position, even the winding 296 will be energized to maintain the normally open contacts CR4b, CR4c and CR4d in closed condition causing the phase-shifting network 16 to provide a lagging voltage output as determined by the setting of the switches SW7 and SW8. The relay CR4 also has normally closed contacts CR4a located in the anode-cathode circuit of the thyratron 27V and, when open, interrupt the biasing circuit for the thyratrons 30V—35V whereby they continue to conduct to short the transformers T20, T21 and T22 throughout the time that energy is being supplied to the welding electrodes E.

When the tailing current is desired, the relay CR4 is de-energized and the conductive condition of the thyratrons 30V—35V is under control of the tailing current controlling network 18. This network comprises a pair of thyratrons 26V and 27V, which are connected in a multivibrator type network whereby the thyratron 27V is normally maintained conductive and is blocked for a predetermined time interval upon the rendering of the thyratron 26V conducting. The blocked time of the thyratron 27V is controlled by means of a timing capacitor C10 which has one of its terminals connected to the control grid of the thyratron 27V and its other terminal connected to the anode of the thyratron 26V. During blocked periods of the thyratron 26V, the capacitor C10 is normally maintained charged by the grid conduction of the thyratron 27V. When the thyratron 26V conducts, it connects the positively charged terminal of the capacitor C10 to the cathode of the thyratron 27V maintaining a blocking bias potential until the charge on the capacitor has decreased to a critical value through a discharge circuit which extends from the grid connected end of the capacitor C10 through the switch sections SW5j, SW3f back to the other terminal of the capacitor C10.

In order to synchronize the instant at which the thyratron 27V can conduct, its screen grid is connected to its cathode through a pulsating direct current potential network 298 having a biasing resistor R43 which, when energized, is polarized to provide a blocking bias between the screen grid and cathode of the thyratron 27V which overrides the positive bias potential applied thereto by the resistor R44. It will be apparent that twice each cycle the resistor R43 will be de-energized and if at this time the capacitor C10 has discharged to its low critical value, the thyratron 27V will conduct at a zero point in the voltage wave between the lines L4 and L5.

Conduction of the thyratron 26V is controlled by means of the bias potential appearing between its grid and cathode. This circuit extends from the controlling grid through a secondary winding 300 of the transformer T23 and under full cycle and alternate polarity operation through a winding 302 of a second transformer T24.

In unipolarity operation, the switch section SW1u opens the circuit through the winding 302 and control of the thyratron 26V is solely from the transformer T23. In full cycle and alternate polarity operation the switch section SW1u will connect the windings 300 and 302 in series circuit and each is effective to fire the thyratron 26V to provide an initiating pulse for network 18 for each half cycle of the output voltage of the welding transformer WT.

One terminal of the primary winding 304 of the transformer T23 is connected by conductor 306 to the positive bus 202 of the network 4. The other terminal of the winding 304 is connected through a capacitor C11 and conductor 308 to the anode of the thyratron 3V. Therefore, upon conduction of the thyratron 3V and the establishing of a potential across its anode resistor network 150, the capacitor C11 will charge to cause the transformer T3 to supply a voltage pulse in its secondary winding 300, which overcomes the normal blocking bias afforded by the resistor R45 and initiates conduction of the thyratron 26V.

One terminal of the primary winding 310 of the transformer T24 is connected of the conductor 306 which, it will be remembered, extends to the positive anode bus 202 of the network 4. The other terminal of the winding 310 of the transformer T24 is connected through a capacitor C12 and conductor 312 to the anode of the thyratron 4V. It will be apparent that upon conduction of the thyratron 4V a charging current will flow to the capacitor C12 through the primary winding 310 to provide a voltage pulse in the secondary winding 302.

The transformers T23 and T24 are each supplied with a second secondary winding 313 and 314 respectively. These windings, during normal operation, supply energizing pulses to the low frequency pulse producing network 22 and to the forge delay timing network 26. In no-weld operation they additionally supply pulses to the sequencing network 24. The transformer T24 has its secondary winding 314 connected by conductor 316 to the third and fourth contacts of the switch section SW1t and to the first contact of the switch section SW1t. In full cycle operation, the conductor 316 is connected through the first contact of switch section SW1t, conductor 318 and the resistor R46 to the common cathode bus 320 of the network 22. The other terminal of winding 314 is connected through conductors 126 and 321, switch section SW1s and conductor 322 to the grid of thyratron 40V whereby a pulsing of the transformer T24 will overcome the hold off bias afforded by resistor R46 to pulse the thyratron 40V into conductivity. The pulsing of the transformer T24, it will be recalled, occurs as a consequence of the conduction of the thyratron 4V of the network 4 which occurs at the beginning of a negative half cycle of output potential to the transformer WT. The timing afforded between the conduction of the thyratron 40V and the re-conduction of the thyratron 41V is equivalent to the length of a negative half cycle and at the end of this time the thyratron 41V will re-conduct to energize the transformer T7, described above in connection with the network 2, to initiate a re-conduction of the thyratron 2V to terminate the weld current period.

During alternate polarity operation, it is desired to initiate the re-conduction of the thyratron 2V to terminate the welding interval at the end of each half cycle and since the network 4 in alternate polarity operation is set to perform a complete half cycle in response to the conduction of either the thyratron 3V or 4V, the secondary winding 313 has one terminal connected to the conductor 316 and its other terminal connected through the conductor 124, a branch conductor 328 to the second, third and fourth contacts of the switch section SW1t. With the switch SW1 set in its second or alternate polarity operating position, the conductor 328 is connected by the switch section SW1t to the conductor 318 and through the above-described circuit to the cathode of the thyratron 40V. The conductor 316 with the switch SW1 in its alternate polarity position is disconnected from both the conductors 318 and the conductor 322, and this in effect places the winding 313 in series with the winding 314 between the conductors 322 and 318 which, it will be recalled, are connected between the grid and cathode of the thyratron 40V. Therefore, the thyratron 40V will be rendered conducting in response to the conduction of either the thyratron 3V or thyratron 4V of the network 4.

It is believed that the remaining details of construction may best be understood from a description of the operation of the combination. Since there are three main categories of operation (intermittent seam, continuous seam and spot), each with four dependent types of polarity operation, it is believed that the description of operation may best be divided into three main headings.

*Intermittent seam operation—full cycle*

To operate the combination in intermittent seam with full cycle output, the switches SW1 and SW2 are each placed in their first positions. Closure of line switch LS (Fig. 1F) energizes the lines L1, L2 and L3 with three phase alternating current which may be of the 60 cycle 440 volt variety normally supplied by public utilities. This energizes the lines L4 and L5 through the transformer T3 and energizes the three phase phase-shifting network 16. The filament circuits for the various thyratrons are conventional and have not been shown in the interest of simplifying the drawings.

As in all of the types of operation to be described, the emergency stop circuit must first be placed in an operating condition. To do this, the start switch SS3 is momentarily closed to complete an energizing circuit for the emergency stop relay CR5 from line L4 through now closed switch SS3, normally closed emergency stop switch SS4 and energizing winding 330 of the relay CR5 to the line L5. Relay CR5 when energized closes its contacts to complete a holding circuit in shunt with the switch SS3 and, if the weld-no weld switch SS2 is in its weld or shown position and the time delay relay CR6 has timed out, will energize the windings 332, 334, 336 and 338 of the relays CR2, CR3, CR7 and CR8 respectively. When energized, relay CR2 closes its contacts CR2a and CR2c and opens its contacts CR2b and CR2d. As will be explained below, this is without function except in spot operation. Relays CR7 and CR8 have their normally open contacts in the anode circuits of the firing thyratrons 12V, 16V and 20V and 11V, 15V and 19V respectively (Fig. 1F) and when these relays are energized, close their normally open contacts to complete the anode circuits for these firing thyratrons. The combination is now in standby operation and a welding operation may now be initiated upon closure of the start switch SS1.

Upon closure of the switch SS1, the relay CR1 will be energized through a circuit which extends from line L4 through the energizing winding 340, switch section SW2a, switch SS1 and switch section SW2b to line L5. When energized the relay CR1 opens its contacts. Opening of contacts CR1a terminates the energization of resistor R14 by the transformer T2 whereby at the next positive pulse provided by the winding 82 the normally blocked thyratron 1V will be rendered conducting. Opening of contacts CR1b is without effect since the circuit thereof is already open at switch section SW1b. Opening of contacts CR1c opens the shunting circuit through the switch section SW2f around the timing resistor R13.

Upon conduction of thyratron 1V, the normally conducting thyratron 2V is rendered nonconducting by the commutating capacitor C3 and thyratron 2V is thereafter held blocked by the bias accorded by the capacitor C5 of the bias circuit 39. When thyratron 2V blocks, the hold off bias developed across the resistor R10 in the anode circuit thereof disappears and the normally nonconducting thyratron 3V will thereafter fire at the next positive pulse provided by the winding 172 of the peaking transformer T8. The blocking of thyratron 2V also initiates the timing out of the biasing circuit 39 through the timing resistors R12 and R13 for determining the length of "heat time."

Conduction of the thyratron 3V causes the commutating capacitor C13 to render normally conducting thyratron 4V non-conducting and thereafter the charge on capacitor C7 of the bias circuit 7 maintains thyratron 4V blocked. When 3V conducts, a potential is established across its anode resistor network 150 and the charging of the capacitor C1 commences at a rate determined by the sum of pulse time, tailing time, and interpulse time as reflected by the setting of the respective switches SW3, SW4, and SW5. During the time that the capacitor C1 is being charged to its critical value, the potential established across the resistor R31 and the sections d of the just-mentioned switches, is applied between the grid and cathode of normally conducting thyratron 5V which thereupon blocks, thereby initiating the timing out of the timing circuit 190 to measure interpulse time. The rate at which the circuit discharges to remove the blocking bias on normally blocked thyratron 7V is controlled by the switch section SW5f of the interpulse timing switch SW5. When the circuit has sufficiently discharged the clipping circuit 194 will cause the thyratron 7V to conduct at an early point in the half cycle in which the anode of thyratron 7V is positive with respect to its cathode and transformer T11 will become energized.

The energization of the transformer T11 unblocks the thyratron 9V which at an instant determined by the degree of phase shift provided by the three phase phase-shifting network 16, will conduct to energize its anode transformer T13. When energized, the winding 244 unblocks the firing thyratron 11V which thereupon fires the ignitron IG1 to provide a flow of current from the line L1 through the ignitron IG1, winding 350 of the welding transformer WT and back to line L2. At the same time, the secondary winding 246 unblocks the thyratron 13V which again at the instant as determined by the degree of phase shift of the phase-shifting network 16 conducts to energize its anode transformer T14. The winding 252 thereof unblocks the firing thyratron 15V which fires the ignitron IG2 to provide for flow of current from the line L2 through the ignitron IG2, the winding 352 of the transformer WT back to the line L3. At the same time the winding 254 of transformer T14 unblocks the thyratron 17V which again at a point determined by degree of phase shift of the phase-shifting network 16 will fire to energize its anode transformer T15. The winding 260 of this transformer then unblocks the firing thyratron 19V which fires the ignitron IG3 to provide for flow of current from the line L3 through the ignitron IG3, the winding 354 of the welding transformer WT back to the line L1.

The winding 262 of transformer T15 is connected by the conductors 356, 358 across a biasing network 360 (Fig. 1E) which, when energized, overcomes the blocking bias potential established by the network 362, renders the normally blocked thyratron 36V of the inverter network 20 conductive. The anode to cathode potential supplied to the thyratron 36V is derived through the conductors 364 and 366 which are connected to be energized by a voltage derived from phase B (L2—L3). The thyratron 36V will fire late in the half cycle of the phase A (L1—L2) voltage applied between the main electrode of the ignitron IG1 and its firing thyratron 11V. When thyratron 36V conducts it energizes the transformer T16 connected in its anode-cathode circuit to supply a pulse through the conductors 268 and 270 to energize the resistor R38. If at this time the thyratron 9V had already rendered the firing thyratron 11V and the ignitron IG1 conductive then this action will be without effect. The thyratron 9V and its tailing thyratrons 13V and 17V will conduct to be rendered sequentially conductive for as many cycles as the transformer T11 of the interpulse timing network 6 continues to be energized. If, however, this occurs after the thyratron 9V has been blocked it will fire the ignitron IG1 to conduct the inductive current.

The thyratrons 13V and 17V must always fire in trailing relationship to the thyratron 9V and therefore, whenever the thyratron 9V is fired a consequent firing of the thyratrons 13V and 17V will result, irrespective of a subsequent change in the energized condition of the transformer T11 and the same number of pulses of energy will be supplied to each of the windings 350, 352 and 354 of the welding transformer WT.

When thyratron 3V was rendered conducting, a voltage was established across its anode resistor network 150 thereby providing a potential difference between the conductors 306 and 308 which charged the capacitor C11 through the primary winding 304 of the transformer T23, the flux induced in this transformer by the charging current energized the secondary windings 300 and 313 thereof. The energization of the winding 300 overcame the normal blocking bias potential which was previously maintaining the thyratron 26V blocked and thyratron 26V thereupon commences to conduct and by means of the commutating capacitor C14 renders the normally conducting thyratron 27V blocked. Blocking of the thyratron 27V interrupts the flow of biasing current which had previously been flowing through the biasing resistors R50, R51, R52 through a circuit extending from the positive bus 368 of the network 18 through the conductor 370 through the resistors R50, R51, R52, conductor 372, the thyratron 27V, the contacts CR4a of relay CR4, and resistor R45 to the negative bus 374 of the network 18. When the resistors R50, R51 and R52 are energized, they apply a blocking bias potential to the thyratrons 30V—35V which are to be held blocked.

Upon blocking of the thyratron 27V the bias potential appearing across the resistors R50, R51 and R52 disappears and the thyratrons 30V—35V conduct to decrease the impedance provided by the transformers T20, T21 and T22 in the three phase phase-shifting network 16. With the impedance of these transformers so reduced, the phase shift imparted by the phase-shifting network 16 is determined by the setting of the switches SW7 and SW8 which provides the minimum amount of phase shifting. Since the network 16 then phase shifts the anode-cathode switch of the thyratrons 9V, 13V and 17V a minimum amount, the ignitrons IG1, IG2 and IG3 will, during the initial energized period of the transformer T11, supply the maximum energy to the welding electrodes E, which is termed welding current.

The time period in which the thyratron 27V is blocked is determined by the charge on the capacitor C10. When the thyratron 26V conducts and the thyratron 27V is blocked, the capacitor C10 will commence to discharge through the hold time switch section SW3f and the interpulse time switch section SW5j. At the end of a predetermined time interval as determined by the setting of the switches SW3 and SW5, the charge on the capacitor C10 will have discharged sufficiently to permit the thyratron 27V to re-conduct. The precise instant with respect to the source voltage wave at which the thyratron 27V re-conducts will be determined by the potential appearing across the blocking bias providing resistor R43. As stated above, this bias potential is a minimum at the instant that the voltage between lines L1 and L2 is zero. When the thyratron 27V re-conducts, it re-energizes the biasing resistors R50, R51 and R52 on the thyratrons 30V—35V which thereupon block to render the resistor controlling switch SW9 effective to increase phase shift of the output voltage of the phase-shifting network 16 to delay the firing of the thyratrons 9V, 13V and 17V and consequently to decrease the amount of current which the ignitrons IG1, IG2 and IG3 permit to flow to the welding transformer WT. This reduced amount of current is called tailing current. At the time the thyratron 27V re-conducted, the commutating capacitor C14 caused the thyratron 26V to become nonconducting. This thyratron 26V will thereafter be held nonconducting by the blocking bias potential appearing across the resistor R45. The transformer T23 is operable to provide only a single pulse at the time that the thyratron 3V of network 4 initiates its conduction and the tailing current will therefore remain for the remainder of the positive half cycle.

At the time that thyratron 4V of the network 4 was blocked, the capacitor C7 of its timing circuit 39 commenced to time out through the pulse time switch section SW3a, the tailing time switch section SW4a, and the interpulse time switch section SW5a. Until the timing network 7 does time out, the thyratron 3V will continue to conduct. It will be noted that in this instance, the time period conduction of the thyratron 3V is the sum of pulse time, tailing time and interpulse time, and the time required for the capacitor C1 in its anode circuit to attain its critical charge is also equal to the sum of pulse time, tailing time and interpulse time.

The thyratron 5V and the thyratron 7V of the interpulse timing network 6 will be held respectively blocked and in conducting condition throughout the time interval during which the timing circuit 7 is timing out. As long as thyratron 7V conducts, transformer T11 will be energized and the thyratrons 9V, 13V and 17V will be sequentially fired to provide a series of current pulses in the same direction in the windings 350, 352 and 354 to continually build up the flux in the welding transformer in a single direction and consequently a positive half cycle of voltage will be impressed across the electrodes E.

When the timing network 7 finally does time out, the thyratron 4V will be pulsed into conduction at a precise instant with respect to the voltage wave by the lines L1 and L2 under control of the winding 182 of the peaking transformer T8. When thyratron 4V conducts, thyratron 3V will be immediately rendered nonconducting due to the effect of the commutating capacitor C13. As soon as thyratron 3V blocked the blocking biasing potential across the thyratron 5V is removed permitting it to conduct and block thyratron 7V to terminate the energization of the transformer T11. Thereafter the thyratron 9V will not conduct to again render the firing thyratron 11V and ignitron IG1 conducting. Since the thyratrons 13V and 17V trail the thyratron 9V, they also will become blocked after the last trailing action in response to the conduction of thyratron 9V. The firing thyratrons 15V and 19V and the ignitrons IG2 and IG3 cannot conduct unless the thyratrons 13V and 17V conduct and the supply of energy for the positive half cycle of voltage to the electrodes E is thereupon terminated.

When the thyratron 4V commences to conduct, it energized its anode resistor network 152 to initiate charging of the capacitor C2 thereof at a rate determined primarily by the setting of the pulse time switch section SW3c, the tailing time switch section SW4c and the interpulse time switch section SW5c. The potential established across these switch sections and the resistor R31a is applied between the shield grid and the cathode of the normally conducting thyratron 6V of the interpulse timing network 10. This potential will block the thyratron 6V permitting its timing circuit 192 to time out at a rate determined primarily by the value of the interpulse time switch section SW5e. At the end of the desired interpulse time interval the circuit 192 will no longer be effective to prevent the clipping circuit 196 from firing the thyratron 8V. This clipping circuit, like the clipping circuit 194, is effective to fire the thyratron only during an initial early portion of the voltage half cycle in which the thyratron 8V can conduct. Upon conduction, the thyratron 8V energizes the transformer T12 which through the conductors 278 and 280 unblocks the thyratron 10V. The thyratrons 10V, 14V and 18V are connected in respective back-to-back relation with thyratrons 9V, 13V and 17V and when unblocked are adapted to energize the anode transformers in sequence and at a time in the respective voltage wave of the source as determined by the phase-shifting network 16 and in the same manner but in the opposite half cycle as described in connection with the thyratrons 9V, 13V and 17V. The rendering of the thyratrons 10V, 14V and 18V conductive causes the firing thyratrons 12V, 16V and 20V to become unblocked. When these thyratrons conduct they unblock their corresponding ignitrons IG4, IG5 and IG6 to provide for a negative half cycle of voltage as described in connection with the positive half cycle.

When the thyratron 4V conducted and potential was established across its anode resistor network 152, a potential was established between the conductors 306 and 312 to charge the capacitor C12 through the primary winding 310 of the transformer T24. In full cycle operation, the secondary winding 302 of transformer T24 is connected in series with the secondary winding 300 of the transformer T23 and the pulsing of transformer T24 will provide for an operation of the tailing current controlling network 18 to provide for weld current and tailing current flow during the negative half cycle in the same manner as described above in connection with the positive half cycle.

At the time that 3V was blocked the timing capacitor C6 of the timing circuit commenced to discharge through the resistor R22, pulse time switch section SW3b, tailing time switch section SW4b and interpulse time switch section SW5b. The timing provided in this circuit is substantially identical to the timing provided through the switch sections SW3c, SW4c and SW5c for the capacitor C2 and at the end of which time the thyratron 3V will again re-conduct to initiate a subsequent half cycle as described above. Conduction of 3V again blocks 4V to render the thyratron 6V and the thyratron 8V of the network 10 respectively conducting and blocked, to terminate the negative half cycle in the same manner that the blocking of 3V terminated the positive half cycle. When the supply of energy for the positive half cycle is terminated the flow of current between the lines L1, L2 and L3 and the welding transformer WT will not ordinarily immediately cease due to the inductance of the welding transformer WT and its secondary circuit and inductive current will continue to flow through the ignitron IG3. As explained above, each time the transformer T15 is energized to fire the ignitron IG3 it also acts to fire the thyratron 26V of the inverter circuit, which places a conducting bias voltage across the firing thyratron 11V late in the positive half cycle of the voltage appearing between lines L2 and L3. Since after termination of the positive half cycle the ignitron IG1 will not have been previously fired, it will be fired at this time to conduct the inductive current flow and block the ignitron IG3. As long as inductive current continues to flow through the ignitron IG1 it will maintain a reversed polarity across the main electrodes of the ignitron IG4 which cannot subsequently be fired. In normal operation it is expected that the inductive current flow will terminate before or shortly after the placing of this firing potential on ignitron IG4. However, if because of any reason, it does not, the attempt to fire ignitron IG4 will have caused no magnetic shorting between the supply lines. If ignitron IG4 should fail to fire entirely, the firing pulse will still be supplied to ignitron IG5 and any normal amount of increased inductive current flow will terminate at least by the time that ignitron IG5 is fired. A similar condition exists between the negative and positive half cycles in which the inductive current flow is transferred to the ignitron IG4, and the thyratron 17V of the inverter network 20 is rendered conducting as a consequence of the conduction of thyratron 18V in the same manner as the thyratron 36V was rendered conducting in response to a conduction of the thyratron 17V. The thyratron 37V is connected in back-to-back relation with the thyratron 36V and consequently energizes the resistor R39 in the control circuit of the firing thyratron 12V in the same manner but in the opposite half cycle as the thyratron 36V energized the resistor R38, to provide for transfer of the conductive current flow from the ignitron IG6 to the ignitron IG4 at the end of the negative half cycle.

The thyratrons 3V and 4V of the multivibrator network 4 will continue to be alternately rendered conductive as described as long as the thyratron 2V of the network 2 remains blocked. At the time that the thyratron 1V conducted and the thyratron 2V blocked, the capacitor C5 of the timing circuit 39 commenced to discharge through the resistors R12 and R13. At some time, determined primarily by the magnitude of the resistance of resistor R13, the capacitor C5 will have sufficiently discharged to permit the thyratron 2V to be rendered re-conducting by a pulse supplied by the transformer T4 under control of the low frequency pulse producing network 22 (Fig. 3). This pulse is always supplied at substantially the end of the negative half cycle.

In full cycle operation, pulsing of the transformer T24, which occurred as a conseqeunce of the initiation of conduction of the thyratron 4V, causes the potential induced in its secondary winding 314 to be applied between the conductors 318 and 322 in opposition to the blocking bias potential established by the resistor R46 to render the normally blocked thyratron 40V conducting. When thyratron 40V conducts, it puts out thyratron 41V by means of the commutating capacitor C15. When this occurs, the timing capacitor C16, controlling the thyratron 41V, commences to discharge through a circuit which extends through the resistor R53, conductor 376, interpulse time switch section SW5h, tailing time switch section SW4e, pulse time switch section SW3e, and conductor 378. At the end of the negative half cycle time period the charge on capacitor C16 will have sufficiently disappeared to permit the pulsing transformer T26 to trigger the thyratron 41V at a precise instant in the voltage wave between the lines L4 and L5. This precise instant is during the opposite half cycle to the half cycle in which the pulsing transformer T8 can pulse the thyratron 3V into a conducting condition.

The time of discharge of the capacitor C16 is adjusted so that the thyratron 41V will conduct at least by the preceding half cycle to the half cycle in which the thyratron 3V would ordinarily be rendered conducting to initiate a subsequent positive half cycle of output voltage to accurately control the timing of the re-initiation of conduction of thyratron 2V. When the thyratron 2V does re-conduct it immediately (by means of the commutating capacitor C3) blocks the thyratron 1V and establishes a potential across the anode resistor R10 to place a blocking bias potential between the shield grid and cathode of the thyratron 3V which cannot be over-ridden by any positive pulses supplied by the peaking transformer T8. Since the time required for the capacitor C2 to reach its critical charge expires at the same time that the thyratron 3V would normally re-conduct to initiate a positive half cycle, the potential which blocks the thyratron 6V of the interpulse network 10 will disappear and the thyratron 6V will re-conduct to terminate the negative half cycle in otherwise the same manner as the negative half cycle would have been terminated had the thyratron 3V re-conducted. Continued conduction of the thyratron 4V is therefore without effect.

At the time that the thyratron 2V conducted and thyratron 1V blocked, the capacitor C4 of the timing circuit 37 commenced to discharge through the resistor R11 and the switch section SW6a. The time interval during which the thyratron 2V will remain conducting and the thyratron 1V will remain blocked depends primarily upon the setting of the cool time switch SW6 and no current will flow to the welding electrodes E during this period. At the end of this time period, the capacitor C4 is sufficiently discharged to remove the blocking bias potential between the grid and cathode of the thyratron 1V and it will re-conduct in response to the next positive pulse supplied by the peaking transformer T1 to initiate a heat time in the same manner as above described. This operation will continue until such time that the start switch SS1 is opened.

When the switch SS1 is opened, the relay CR1 will de-energize and close its contacts CR1a, CR1b, CR1c. Closure of the contacts CR1a re-establishes the energization of the resistor R14 to thereby prevent the positive peaks of voltage supplied by the winding 82 of transformer T1 from again rendering the thyratron 1V conducting. The closure of the contacts CR1b is without effect because in this mode of operation the re-conduction of thyratron 2V is under control of the pulsing transformer T4. Closure of the contacts CR1c shunts the discharge resistor R13 thereby insuring a fast discharge of the timing capacitor C5 in the timing circuit 39. If this occurs during heat time, thyratron 1V continues to conduct until the end of the next negative half cycles at which time the transformer T4 is pulsed to render the thyratron 2V conducting. When this occurs thyratron 1V will block to terminate any further energization of the welding transformer WT. If the opening of switch SS1 occurs during a "cool time" (blocked time of thyratron 1V), the thyratron 1V will never be rendered re-conducting and the said operation will be terminated.

*Intermittent seam—alternate polarity*

With alternate polarity operation, the initiation of the weld-seam weld is accomplished by closure of the start switch SS1. In this case, however, the switch SW1 will be in its second position in which the switch section SW1b will connect the resistor R16 in the shield grid circuit of the thyratron 2V for pulsation by the winding 94 of the peaking transformer T1. During operation, however, the resistor R16 will not be pulsed due to the then open condition of the contacts CR1b of the relay CR1, which will remain open until the end of the seam weld. At the end of the weld as determined by the opening of the switch SS1, the relay becomes deenergized and the transformer T1 supplies the pulse to re-fire thyratron 2V. Since the network 2 is not utilized for timing, it is only necessary to have the timing circuits 37 and 39 thereof in the proper discharge condition at the time that the seam is completed. In order to assure this, the switch section SW1f completes a shunting circuit around the resistor R13 under control of the contacts CR1c, and the closure of these contacts CR1c will insure a complete discharge of the capacitor C5, even though the seam may be of extremely short duration. Capacitor C5 is arranged to discharge through the resistors R11 and R11a, which consequently shortens its time of discharge.

It will be recalled that in full cycle operation the "cool time" was controlled by the discharging of capacitor C5 through the switch section SW6a. In alternate polarity operation, the "cool time" following the negative half cycle "heat time" is controlled by the same switch section SW6a which has now been disconnected from the timing circuit 37 by the switch sections SW1e and SW1f and together with resistor R22a has been inserted in the timing circuit 5 of the network 4 by the switch sections SW1n and SW1o to add the desired length of "cool time" to the blocked time of thyratron 3V. The timing required to charge the capacitor C2 to its critical charge remains under control of the sections SW3d, SW4d, and SW5d and is the sum of the pulse time, the tailing time, and interpulse time. Since more time has been added to the conducting period of thyratron 4V without more time being added for charging the capacitor C2 to its critical charge, the length of negative half cycle of energy pulse will remain the same and the difference between the time required to charge the capacitor C2 to its critical potential and the time required to discharge the timing capacitor C6 to permit re-conduction of thyratron 3V is reflected as the "cool time" period which follows the "heat time" which is the time required to charge the capacitor C2 to its critical charge.

Likewise, the switch section SW1j at its alternate polarity setting will interrupt the shunting circuit across the resistor R20 and the switch section SW6b thereby inserting this additional resistance in the discharging circuit of the capacitor C7 to increase the time period during which the thyratron 3V conducts. The time required to charge the capacitor C1 to its critical potential still remains under control of the sections SW3c, SW4c, and SW5c and is the sum of pulse time, tailing time, and interpulse time. The time required to charge the capacitor C1 to its critical charge is the "heat time" of the positive half cycle and the difference between the time required to charge the capacitor C1 and the conducting time period of the thyratron 3V will be reflected as the "cool time" period which follows the positive half cycle. With these differences, the remainder of the operation in alternate polarity is the same as described above in connection with full cycle polarity with the exception that the pulse for initiating the re-conduction of thyratron 2V now occurs from the peaking transformer T1 as a consequence of the opening of the start switch SS1.

*Intermittent seam—unipositive*

The operation at unipositive is similar to that described above in connection with alternate polarity except that the timing of the multivibrator network 4 is like that described in full cycle operation and the "heat time" is the time period that the thyratron 4V is held blocked due to the timing of the timing circuit 7. The switch section SW1j in this position re-connects the shunt circuit about the resistor R20 and the resistor section SW6b so that the timing of the discharge capacitor C7 is primarily controlled by the setting of the switch sections SW3a, SW4a, and SW5a, and will be equal to the sum of pulse time, tailing time and interpulse time. The length of time that the thyratron 3V remains blocked will be the "cool time." The switch section SW1m effectively shorts out the switch sections SW3b, SW4b, and SW5b leaving only the resistor R22 and the switch section SW6a for controlling the time period of the discharge capacitor C6. This provides the same "cool time" interval as occurred in alternate polarity operation. The switch section SW1p disconnects the grid circuit of the thyratron 6V of the interpulse timing network 10 from the bias potential established during the charging of the capacitor C2 and re-connects the grid to the cathode of thyratron 6V so that this thyratron 6V remains conducting irrespective of the flow of any charging current to the capacitor C2. The circuit controlling the flow of charging current to the capacitor C1 remains under control of the switch sections SW3d, SW4d, and SW5d and will be the same as the conducting time period of the thyratron 3V. In other respects the operation in unipositive polarity is the same as described above in connection with full cycle operation, it being remembered that no negative half cycle is supplied and that the re-conduction of thyratron 2V is the same as in alternate polarity operation.

*Intermittent seam—uninegative*

The operation in uninegative polarity is very nearly the same as that in unipositive polarity with the exception that the switch section SW1p connects the interpulse timing network to respond to the flow of charging current to the capacitor C1 and the switch section SW1r disconnects the control grid of the thyratron 5V of the interpulse timing network 6 from the network 4 and re-connects the grid to the cathode of thyratron 5V whereby thyratron 5V will remain conducting, similarly as 6V remained conducting in unipositive operation. The other difference from unipositive operation is the energization of the polarity reversing control relay CR9 by the switch section SW1a. Upon energization, the relay CR9 reconnects the primary of peaking transformer T8 in opposite phase with respect to the voltage appearing between lines L4 and L5 so that the thyratrons 3V and 4V are pulsed into conduction on the opposite half cycles than they are in any of the other polarity operating conditions.

*Continuous seam—full cycle*

Continuous seam full cycle operation, as in intermittent seam operation, is controlled by the open and closed condition of the switch SS1. In all of the continuous seam polarity operations the shield grid of the thyratron 2V is connected to be peaked from the secondary winding 94 of the peaking transformer T1, but the positive peaks are prevented from triggering the thyratron 2V into conducting condition throughout the period of time that the start switch SS1 is held closed due to the open contacts CR1b as described in connection with intermittent seam alternate polarity operation. The timing of the discharge of the capacitors C4 and C5 is exactly the same as described in connection with intermittent seam full cycle. Further, the shield grid biasing circuits for the thyratrons 3V and 4V of the network 4 and the discharge circuits for the discharge of the timing capacitors C6, C7 and the charging of the capacitors C1 and C2 is the same as in the intermittent seam full cycle. The chief difference between the two types of seam operation at full cycle is that in continuous seam the thyratron 1V continually conducts throughout the seam and the thyratron 2V is not pulsed into conduction until the opening of the start switch SS1 at the end of the seam.

*Continuous seam—alternate polarity*

The chief difference between full cycle and alternate polarity operation at continuous seam is in the operation of the network 4 in which the timing constants thereof are arranged similarly to that described above in connection with intermittent seam alternate polarity. In fact, the operation of the system with the switch SW2 set for continuous seam and the switch SW1 set for intermittent seam is otherwise exactly the same as described in connection with continuous seam alternate polarity operation.

*Continuous seam—unipositive and uninegative*

This type of operation at continuous seam is substantially the same as in the comparable unipositive and uninegative conditions as described in connection with intermittent seam operation.

*Spot operation—full cycle*

When it is desired to operate the combination for spot welding full cycle operation, the switch SW1 is set in its first position and the switch SW2 is set in its third position. The switch sections SW2a and SW2b when in their third position, disconnect the start switch from the control circuit of the relay CR1 and re-connect it between control conductors 380 and 382 which control the energization of operation of the sequence timer 24 (Fig. 2). As illustrated, the switch SS1 acts as the second stage pilot to initiate a welding operation subsequent to the initiation of the squeeze operation, as a consequence of the previous closure of a first stage pilot switch SS5. It will be apparent, however, that if the second stage pilot operation is not desired, the conductors 380 and 382 may be disconnected from the terminals 384 and 386 respectively and connected between the lines L6 and L7 in parallel with or replacing the first stage pilot switch SS5. In this event, a jumper would be connected between the terminals 384 and 386. In the case of two stage pilot operation, the closure of start switch SS5 will complete a circuit from the line L6 through the start switch SS5, the energizing winding 388 of control relay CR10, the thyratron 61V and conductor 390 to the line L8. The lines L6 and L8 are energized from the secondary winding of a potential supplying transformer T27 energized from the lines L4 and L5. The thyratron 61V is normally in a condition to conduct and upon completion of the anode circuit thereof through the start switch SS5 it conducts to energize the relay CR10 which closes its contacts CR10b to complete a shunt or holding circuit about the first stage pilot switch SS5 which may now be opened without interfering with the sequence. Closure of the contacts CR10a energizes the solenoid valve controlling relay CR11 which closes its contacts CR11b to close the normal energizing circuit, not shown, for bringing the electrodes E against the work W with a normal pressure. Closure of the contacts CR11a completes a circuit from the line L4 through the contacts CR11a, conductor 392 energizing winding 394 of relay CR12, forge-no forge switch SS6 (Fig. 3) to line L5. If the forge switch SS6 is closed then the relay CR12 will be energized for rendering the forge time delaying network 26 responsive to the pulsing of the transformer T32.

Referring now to the further effects of the energization of the relay CR10, closure of its contacts CR10c completes the direct potential voltage circuit for the anode-cathode circuit of the thyratron 64V without effect at the present time since the thyratron 64V is now being held blocked by means of the potential established across resistor R54 from the transformer T28 having its primary winding connected between the lines L6 and L8. After a predetermined pressure has been built up in the fluid circuit which actuates the electrodes E, the pressure switch SS7 will close. If, as shown, the sequence network 24 is connected for two stage operation, no further sequencing will result until closure of the second stage pilot switch SS1. If, however, the switch SS1 were connected to provide for single stage operation and the terminals 384 and 386 were jumpered, the further operating stages about to be described as a consequence of the closure of the second stage pilot switch SS1, would automatically occur. In this instance, however, the further stages will not occur until the switch SS1 is closed. Closure of the switch SS1 completes a circuit from the line L7 through the primary winding of transformer T29, the thyratron 61V, and conductor 390 to the line L8. With the switch SS5 or the contacts CR10b closed, the line L7 will be at the same potential as the line L6 and the transformer T29 will be energized to energize the blocking bias resistor R54 through a circuit which extends from the terminal 392 through the line L8 through the biasing resistor R55, the conductors 394, 396, resistor R54, rectifier 398 to the other terminal 400 of the transformer T29. The potential established across the resistor R54 opposes the conducting potential established across the resistor R55 and places a blocking bias between the grid and cathode of the thyratron 62V. During the standby conducting period of the normally conducting thyratron 62V, the squeeze time network 402 will have become charged through a circuit which extends from the line L6 through the network 402, the thyratron 62V and conductor 404 to the line L8. This network 402 comprises a capacitor C17 having in shunt therewith a variable resistor network R56. The positive terminal of the network 402 is connected through line L6 and conductor 406 to the cathode of thyratron 63V. The grid of this thyratron 63V is connected through a clipping network 408 energized from a transformer T30 and a fixed resistor R57 to the negative terminal of the squeeze time network 402. Therefore as long as the charge on the capacitor C17 of the squeeze time network 402 is above a critical charge the thyratron 63V will remain blocked.

When the thyratron 62V blocks, the capacitor C17 commences to discharge through the resistor network R56 and after a predetermined time interval the capacitor C17 will have discharged sufficiently to permit the thyratron 63V to conduct. When thyratron 63V conducts it energizes its anode transformer T31. Upon energization of transformer T31 the unblocking bias resistor R58 will be energized to overbalance the blocking bias potential supplied by the resistor R54 to cause thyratron 64V to conduct. In this respect, it should be noted that the clipping circuit 408 is arranged to insure that if the thyratron 63V conducts at all it will conduct near the beginning of the voltage wave in which line L8 is positive with respect to line L6. This insures that the thyratron 64V will be fired at a predetermined time with respect to the source voltage wave.

Upon conduction, thyratron 64V establishes a potential drop across its anode resistor R59. The drop across the resistor R59 is used to charge the capacitor C18 connected in series with the primary winding of transformer T5. The charging current of the capacitor C18 causes the transformer T5 to pulsate the resistor R60 connected across its secondary winding. One terminal 410 of the resistor R60 is connected through conductor 88 and the now closed contacts CR2c to the terminal 118 of the resistor R17. The other terminal 412 of the resistor R60 is connected through conductor 90, the now closed contacts CR2a of the relay CR2 and the switch section SW2d to the other terminal 122 of the resistor R17. The pulse which momentarily appears across the resistor R60 likewise appears across the resistor R17.

At full cycle operation, the potential pulse appearing across resistor R17 will overcome the normal blocking bias potential maintained between the shield grid and cathode of the thyratron 1V by the resistor R2 and initiate conduction of the thyratron 1V at a predetermined point in the source voltage wave. The network 2 is utilized to provide the desired weld time and the timing afforded between the conduction of thyratron 1V and the reconduction of thyratron 2V is controlled primarily by the setting of the resistor R13 to provide this function. When the contacts CR1c in the shunt circuit around the resistor R13 are closed, it will be observed that with the switch section SW1f in its first position (full cycle) and the switch section SW2f in its third position (spot), the circuit between conductors 76 and 78 is broken and the discharge rate of capacitor C5 is controlled by the setting of resistor R13. The timing provided by the capacitor C4 is not used in full cycle spot welding operation and its discharge circuit is connected to rapidly discharge through the resistors R11 and R11b by the switch section SW2e. The switch sections SW1d and SW1e may at this time have the switch section SW6a connected in shunt with the resistors R11b. However, the value of the resistor R11b is so small that the timing is relatively uninfluenced by any setting of the switch SW6. In this type of full cycle operation the network 4 is connected and functions in substantially the same manner as described above in connection with seam welding full cycle operation. Furthermore, the conductive periods of 3V and 4V act to provide for positive and negative half cycles of output voltage to the electrodes E in a manner which may be clearly understood from the description of operation found in the description of intermittent seam full cycle operation.

In spot full cycle, the thyratron 2V is connected to be pulsed into conductive condition by the pulse supplied to the transformer T4 from the low frequency pulse producing network 22 so that the network 2 always insures an equal number of negative and positive half cycles of energy to the electrodes E for any one energization thereof from the sequence timer 24. When the thyratron 2V re-conducts and establishes a conducting potential across its anode resistors R7, R8, R9 and R10, a flow of charging current for the capacitor C18 will flow through the primary winding 148 of transformer T7. This results in a voltage pulse being established in the secondary winding 146 thereof which is connected between the conductors 142 and 138 through the now closed contacts CR3b and switch section SW1c. The conductors 138 and 142 are connected to the biasing circuit of the thyratron 65V. When so energized, the potential overcomes the normal blocking bias potential maintained across resistor R61 whereby the normally blocked thyratron 65V is rendered conducting.

Upon initiation of conduction of the thyratron 65V, a potential is established across its anode resistor R62 which is applied as a blocking bias potential between the control grid and cathode of the thyratron 66V. In this respect it will be noted that the negative or anode end of the resistor R62 is connected to the grid of the thyratron 66V through conductor 414 while the other or positive end of the resistor R62 is connected through conductors 416 and 394, resistor R55, line L8 and conductor 418 to the cathode of thyratron 66V. Therefore, upon conduction of the thyratron 65V the thyratron 66V will become blocked to permit the hold time network 420 in its anode circuit to discharge.

The hold time network 420 is similar to the squeeze time network 402 and comprises a capacitor C19 and a resistor network R63. When charged, the hold time network 420 applies a blocking bias potential to the thyratron 67V, the negative terminal thereof being connected by conductor 422 to the grid of thyratron 67V and the positive terminal thereof being connected through the conductor 394, resistor R55 and conductor 424 to the cathode of thyratron 67V. After a predetermined "hold time," the network 420 will have discharged sufficiently to permit the thyratron 67V to conduct.

When thyratron 67V conducts it charges the off time network 426 which, like the networks 402 and 420, comprises a capacitor C20 and a resistor network R64. When the off time network 426 is energized it blocks the thyratron 61V, the positive terminal of the network 426 being connected by conductor 428 to the grid of the thyratron 61V and the negative terminal being connected to the cathode of thyratron 61V through the resistor R55, line L8, and conductor 390. When thyratron 61V blocks, the relay CR10 is de-energized to open its contacts CR10a, CR10b, and CR10c. Opening of the contacts CR10a de-energizes the relay CR11 whereby its contacts CR11a and CR11b open to de-energize the ram circuit for the electrodes E and reset the initiating circuit for the forge time delay network 26. Opening of the contacts CR10b opens the holding circuit between the lines L6 and L7. Opening of the contacts CR10c de-energizes the anode circuit for the thyratrons 64V and 65V and places them in readiness for a subsequent operation of the sequencing network 24. Blocking of the thyratron 61V also de-energizes the transformer T29 and de-energizes the resistor R54 to permit the thyratron 62V to re-conduct and re-energize the squeeze time network 402. Upon de-energization of the network 402, the thyratron 63V is blocked to de-energize the transformer T31 which de-energizes the resistor R58 to permit the resistor R54 to again apply a blocking bias potential to the thyratron 64V.

When the anode circuit of the thyratron 65V was interrupted by opening the contacts CR10c, the blocking bias for the thyratron 66V was removed and thyratron 66V commenced to re-conduct and re-establish a blocking bias potential across the hold time network 420 to block the thyratron 67V. Blocking of the thyratron 67V permits the off time network 426 to time out and after a predetermined off time interval a subsequent sequence of operation as above described will re-occur if at this time the switches SS5 and SS1 are still closed. If "squeeze time" is not desired, the switch SS8 is moved to its other position in which closure of the pressure switch SS7 and the start switch SS1 will directly initiate conduction of the thyratron 63V under control of the clipping network 408. In other respects the operation would be as above described.

Earlier it was mentioned that the relay CR12 of the forge delay network 26 was energized as a consequence of energization of the relay CR11. When this occurs the contacts CR12a and CR12c thereof close and the contacts CR12b open. Closure of the contacts CR12a supplies anode potential for the anode-cathode circuit of the thyratron 68V. Opening of the contacts CR12b opens the discharge circuit of the timing capacitor C21 and closure of the contacts CR12c supplies anode potential to the thyratron 69V. The transformer T32 has its primary winding connected to the conductors 124 and 126 which, it will be remembered, are pulsed in accordance with each energization of both of the thyratrons 3V and 4V of the network 4. Therefore, the first to conduct of the thyratrons 3V and 4V will supply an energizing pulse to the transformer T32 which overcomes the normal hold off bias voltage established across the resistor capacitor network 430 to render the thyratron 69V conducting at a predetermined precise instant. When the thyratron 69V conducts it completes a circuit from the positive bus 432 of the network 26 through the thyratron 69V, the timing resistors R65, R66, R67 and R68, conductor 434, switch section SW5g, conductor 436, capacitor C21 back to the negative bus 438. The capacitor C21 therefore commences to charge at a rate determined by the resistors R65—R68 and the switch section SW5g.

At a predetermined time subsequent to initiation of conduction of the thyratron 69V, the capacitor C21 will have attained a sufficient charge to overcome the blocking bias potential normally maintained on the thyratron 68V by the resistors R69 and R70 and the thyratron 68V will conduct. Upon conduction, the thyratron 68V energizes the forge solenoid valve winding 440 which through conventional means not shown, acts to increase the pressure at which the welding electrodes E are urged against the work W. The timing of the charging of the capacitor C21 is controlled by means of the resistors R65—R68 to provide for initiating the increase in electrode pressure at any desired time in the welding cycle. Since in most instances this increase in pressure will be desired to occur at a predetermined time subsequent to the initiation of the flow of welding current, the switch section SW5g is also incorporated in the charging circuit of the capacitor C21 to provide for adding to and subtracting from the charging time of capacitor C21 an amount equal to the increase or decrease in interpulse time.

*Spot operation—alternate polarity*

In alternate polarity spot welding, the network 2 is not used to time the duration of weld current flow and is used merely to initiate one such operation thereof. Since it is so used, it is desired to have the thyratron 2V re-conduct prior to the end of the half cycle pulse period. To accomplish this the control of the screen grid of the thyratron 2V is shifted from the transformer T4 to the peaking transformer T1 which supplies a positive voltage pulse which overrides the normal blocking bias provided by the resistor R2 to render the shield grid at a firing potential once each cycle of the source frequency. In alternate polarity, the resistor R13 in the discharge circuit of the capacitor C5 is shunted by means of the switch section SW1f to provide for a minimum time period in which the thyratron 2V remains nonconducting. Similarly, the off time period of the thyratron 1V is not utilized for any timing purpose and consequently the capacitor C4 is quickly discharged through the resistors R11 and R11a, as described above in connection with alternate polarity operation.

Spot welding alternate polarity operation differs somewhat from the two types of seam alternate polarity operation in the manner in which the blocking of thyratron 2V acts to initiate an operation of the network 4. In alternate polarity operation, the switch sections SW1g and SW2g connect the shield grid to cathode circuit of the thyratron 4V across the resistor R10 in the anode circuit of the thyratron 2V. Therefore, whenever the thyratron 2V conducts the potential appearing across the resistor R10 will prevent either of the peaking windings 172 or 182 from firing its respective thyratron 3V and 4V and consequently the one of the thyratrons 3V or 4V which was conducting at the time that thyratron 2V re-conducted will continue to conduct. At the next time that the thyratron 2V is blocked, the blocked one of the thyratrons 3V or 4V will initiate conduction and render the other of the thyratrons nonconducting. As mentioned above, the time interval in which the thyratron 2V is blocked is short in comparison with the discharge time of either of the capacitors C6 or C7. Consequently, for each operation of the network 2 by the sequencing network 24 only a single reversal of the operating conditions of the thyratrons 3V and 4V will occur.

In alternate polarity operation, the discharging circuit for the capacitor C7 includes only the resistor R24 which is set to equal or exceed the length of time required for any desired half cycle period. The actual time of the half cycle pulse will be determined by the time required for the capacitor C1 in the anode circuit of the thyratron 3V to attain its critical charge. Likewise, the discharge circuit for the capacitor C6 includes only the resistor R26 which times the discharge thereof similarly as the resistor R24 times the discharge of the capacitor C7. In this instance, also, the time required for increasing the charge on the capacitor C2 to its critical value determines the actual length of half cycle pulse period.

It will therefore be apparent that either of the thyratrons 3V or 4V in alternate polarity position may be continually conducting but that subsequent to the next conducting pulse, the opposite one of these thyratrons 4V or 3V will conduct and continue to conduct. It is believed that the remainder of the operational sequence in alternate polarity spot welding operation may be understood from the foregoing description.

It sometimes happens that it is desired to operate the combination without energizing the electrodes when it is set in alternate polarity position and still have the next actual energization of the transformer in the opposite direction to the previous energization. To accomplish this, the weld-no weld switch SS2 is opened to de-energize the relays CR2, CR3, CR7, CR8. When the relay CR2 is de-energized the contacts CR2a and CR2c thereof are opened and the contacts CR2b and contacts CR2d thereof are closed. This connects the conductors 88 and 90 leading from the sequencing network directly to the conductors 124 and 126 whereby the pulse supplied from the sequencing network is fed directly to the transformers T23 and T24 whereby the pulses required for actuating the forge delay network and the low frequency timing network may be derived directly rather than through the network 2 and subsequent networks. By so operating the combination, the thyratron 2V is not rendered nonconducting to initiate a transfer of conduction in the network 4. This is an important sub-combinational feature of this invention since it permits operation under no-weld conditions and yet in the next subsequent weld condition the proper energization of the welding transformer WT will be obtained.

*Spot welding—unipositive and uninegative*

In unipositive and uninegative spot welding operation, the network 2 is actuated from the sequence timer 24 in the same manner as in the alternate polarity operation and the timing out of the timing circuits 37 and 39 thereof occurs in the same manner as described in connection therewith. The difference in the unipolarity operation and the alternate operation is in the manner in which the network 4 controls the interpulse networks 6 and 10. In unipositive operation the interpulse network 6 is set to be actuated by the conduction of thyratron 3V and for a time interval as determined by the blocked time of the thyratron 4V, and the interpulse time network 10 is rendered unresponsive to the conduction of thyratron 4V, similarly as described in connection with previous unipositive operation.

In uninegative operation, the interpulse timing network 10 is connected to respond to the conduction of thyratron 3V and the timing of the negative half cycle pulse is determined by the blocked time of the thyratron 4V. In this instance, the interpulse timing network 6 will be rendered unresponsive to the conduction of either of the thyratrons 3V or 4V.

It is believed that the other details of operation in unipolarity spot welding operation will be apparent from the foregoing detailed description.

It is appreciated that various detailed modifications may be made in various constructional details and it is therefore intended that the limits of this invention will be determined not by the illustrative embodiment illustrated and described herein but by the scope of the hereinafter appended claims.

What is claimed and is desired to be secured by United States Letters Patent is as follows:

1. In a multivibrator network, a pair of electric discharge devices, each said device having a main electrode and a control electrode, a plurality of potential establishing devices, a first circuit means connecting a first and a second and a third of said potential establishing devices in series relation between said electrodes of a first of said discharge devices, a second circuit means connecting said first and said second and a fourth of said potential establishing devices in series relation between said electrodes of the second of said discharge devices, said first and said second potential establishing devices being of unidirectional polarity and polarized in a direction to urge said control electrode negative with respect to said main electrodes, said third potential establishing device being periodically energized to provide a bias pulse to urge said control electrode positive with respect to said main electrode of said first discharge device, said fourth potential establishing device being periodically energized to provide a bias pulse to urge said control electrode positive with respect to said main electrode of said second discharge device, the magnitude of the potential established by said third and said fourth potential establishing devices being such with respect to said first device that, with said second potential device deenergized, the bias between said electrodes is insufficient to hold said discharge device blocked, and means responsive to the initiation of conduction of one said discharge device to terminate conduction in the other said discharge device and vice versa.

2. In a multivibrator network, a pair of electric discharge devices, each said device having a pair of electrodes, each said device being held against initiation of conduction as long as the potential between its said electrodes is below a critical value, a plurality of bias voltage producing devices, means connecting a first and a second of said bias devices between said electrodes of a first of said discharge devices, means connecting said first and a third of said bias devices between said electrodes of the second of said discharge devices, said first bias device being of unidirectional polarity, the magnitude and polarity of the bias potential established by said first bias device between said electrodes of each of said discharge devices being such that, when the remainder of said bias devices are ineffective, the bias potential between said electrodes of each of said discharge devices is below said critical value, means periodically energizing said second and said third bias devices with a pulsating potential, the magnitude and polarity of which is sufficient to raise the bias potential between said electrodes of the respective said discharge device at least to said critical value irrespective of the continued energization of said first bias device, means connecting said second and said third bias device to said energizing means such that said second and said third bias devices alternately establish said pulsating potentials, and means for simultaneously rendering said second and said third bias devices ineffective to establish said critical value, and means responsive to the initiation of conduction of one said discharge device to terminate conduction in the other said discharge device and vice versa.

3. The combination of claim 2 in which means is provided to block either of said discharge devices in response to the conduction of the other thereof, and means for preventing the re-conduction of each said discharge device for a predetermined time interval subsequent to its becoming nonconductive.

4. In a control network, a pair of thyratrons each being provided with an anode and a cathode and a pair of control electrodes, a first biasing circuit connected between said cathode and one of said control electrodes of a first of said thyratrons and including a first and a second and a third bias potential producing device, a second biasing circuit connected between said cathode and one of said control electrodes of the second of said thyratrons and including said first and said second and a fourth bias potential producing device, said first and said second bias potential producing devices being operable when energized to maintain a unipolarity potential thereacross, means for pulsatingly energizing said third and said fourth bias devices in an alternating manner whereby they are effective to alternatingly provide bias voltage pulses, said pulses being of such magnitude with respect to the magnitude of the potential of said first and said second bias devices that said pulses are ineffective to render said discharge devices conductive so long as both said first and said second bias devices are energized, the magnitude of said pulses of said third and said fourth bias devices being effective solely when one of said first and said second bias devices is deenergized to provide periodically a conducting bias potential between said one control electrode and said cathode of the respective said thyratrons, a first timing network set as a consequence of the blocking of said first thyratron and actuated to perform its timing function as a consequence of the conduction of said first thyratron, a third biasing circuit controlled by said first timing network and connected between the other of said electrodes and said cathode of said second thyratron, said third biasing circuit being effective during the timing out of said first timing network to maintain a blocking bias potential between said other electrode and said cathode of said second thyratron, a second timing network set as a consequence of the blocking of said second thyratron and actuated to perform its timing function as a consequence of the conduction of said second thyratron, a fourth biasing circuit controlled by said second timing network and connected between the other of said electrodes and said cathode of said first thyratron, said fourth biasing circuit effective during the timing out of said second timing network to maintain a blocking bias potential between said other electrode and said cathode of said first thyratron, and means for rendering said first thyratron nonconductive as a consequence of the rendering of said second thyratron conductive and vice versa.

5. In a control network, a first and a second thyratron, each said thyratron having an anode and a cathode and a control electrode, a pair of secondary windings adapted to be energized with alternating potential, each said secondary winding having a first and a second terminal and arranged so that said first terminals are positive with respect to said second terminals at the same time, a first source of bias potential having positive and negative terminals, means connecting said positive terminal of said bias potential to each of said cathodes, means connecting said first terminal of one of said windings to said control electrode of said first thyratron, means connecting said second terminal of the other of said windings to said control electrode of said second thyratron, and a first impedance element connected at one portion to said negative terminal of said bias potential and at a second portion to said second terminal of said one winding and said first terminal of said second winding.

6. The combination of claim 5 in which switching means is provided to disconnect said first terminal of said second winding from said element second portion and to connect said just-mentioned first terminal to said element one portion.

7. The combination of claim 5 in which there is provided a timing apparatus having a direct current output circuit, and a control device for initiating a timing operation thereof, said timing network being characterized by the fact that said output circuit remains energized except during the timing operation of said timing network, means connecting said output circuit across at least a portion of said first impedance element whereby said first impedance element is energized to maintain its said one portion positive with respect to said second portion during the period that said output circuit is energized.

8. The combination of claim 5 in which each of said thyratrons is provided with a second control electrode, a first capacitor connected between said second control electrode of said first thyratron and said anode of said second thyratron, a second capacitor connected between said second control electrode of said second thyratron and said anode of said first thyratron, a common anode connection adapted to be connected to the positive side of a source of direct potential, a first anode connection including a second impedance element and connecting said common anode connection to said anode of said first thyratron, a second anode connection including a third impedance element and connecting said common anode connection to said anode of said second thyratron, a first electrical path including a fourth impedance element connected between the terminal of said second capacitor which is connected to said second control electrode of said second thyratron and a point in said first anode connection therein which is spaced from said common anode connection by at least a portion of said second impedance element, a second electrical path including a fifth impedance element connected between the terminal of said first capacitor which is connected to said first thyratron second control electrode and a point in said second anode connection which is spaced from said common anode connection by at least a portion of said third impedance element, and a third capacitor connected between said anodes.

9. The combination of claim 8 in which there is provided a timing apparatus having a direct current output circuit, and a control device for initiating a timing operation thereof, said timing network being characterized by the fact that said output circuit remains energized except during the timing operation of said timing network, means connecting said output circuit across at least a portion of said first impedance element whereby said first impedance element is energized to maintain its said one portion positive with respect to said second portion during the period that said output circuit is energized, said timing operation of said timing network being further characterized by the fact that the time period thereof is less than the time required for either of said first and said second capacitors to discharge sufficiently through their respective said paths to remove the blocking bias potential placed thereby on said first and said second thyratrons respectively.

10. In a control of the character described, a pair of multivibrator networks, each said network comprising a pair of thyratrons, each said thyratron having a pair of principal electrodes and a pair of controlling elements, each said thyratron being capable of initiating conduction solely when the potential between one of said principal electrodes and each of said controlling elements is at least as great as its respective critical firing voltage, each said network including a pair of timing devices for measuring a desired time interval, each said device having an output circuit the potential of which is a function of said time interval, each said network including means connecting said output circuit of a first of said pair of devices between said one principal electrode and one of said controlling elements of a first of its respective said pair of thyratrons, each said network including means connecting said output circuit of a second of its respective said pair of devices between said one principal electrode and one of said controlling elements of a second of is respective said pair of thyratrons, means interconnecting said first timing devices with the respective said second thyratrons and said second timing devices with the respective said first thyratrons whereby initiation of conduction of said thyratron with which a said timing device is interconnected will initiate a timing function of said associated device, said timing output circuits being connected in such polarity with their respective said thyratrons whereby said timing devices maintain a potential below said critical potential between the respective said one electrode and said one control element to which it is connected for a desired time period subsequent to the initiation of conduction of the opposite of said pair of thyratrons of the said multivibrator network with which the said timing network is associated, a first blocking bias means connected between the other of said control elements and said one principal electrode of each of said thyratrons of a first of said multivibrator networks, a second blocking bias means connected between the other of said control elements and said one principal electrode of each of said thyratrons of the second of said multivibrator networks, a first bias establishing means associated with said first blocking bias means for increasing the potential between said other control element and said one principal electrode of one of said thyratrons of said first multivibrator network, a second bias establishing means associated with said first blocking bias means for increasing the potential between said other control element and said one principal electrode of the other of said thyratrons of said first multivibrator network, a third bias establishing means associated with said second blocking bias means for increasing the potential between said other control element and said one principal electrode of both of said thyratrons of the second of said multivibrator networks, and a fourth blocking bias means associated with one of said thyratrons of said first multivibrator network and connected with said third bias establishing means and said second blocking bias means whereby the potential established by said third bias means between said other control element and said one principal electrode of said thyratrons of said second multivibrator network is a function of the conductive condition of said one thyratron of said first multivibrator network.

11. In a control of the character described, a pair of multivibrator networks, each said network comprising a pair of thyratrons, each said thyratron having a pair of principal electrodes and a pair of controlling elements, each said thyratron being capable of initiating conduction solely when the potential between one of said principal electrodes and each of said controlling elements is at least as great as its respective critical firing voltage, each said network including a pair of timing devices for measuring a desired time interval, each said device having an output circuit the potential of which is a function of said time interval, each said network including means connecting said output circuit of a first of said pair of devices between said one principal electrode and one of said controlling elements of a first of its respective said pair of thyratrons, each said network including means connecting said output circuit of a second of its respective said pair of devices between said one principal electrode and one of said controlling elements of a second of its respective said pair of thyratrons, means interconnecting said first timing devices with the respective said second thyratrons and said second timing devices with the respective said first thyratrons whereby initiation of conduction of said thyratron with which a said timing device is interconnected will initiate a timing function of said associated device, said timing output circuits being connected in such polarity with the respective said thyratrons whereby said timing devices maintain a potential below said critical potential between the respective said one electrode and said one control element, to which it is connected, for a desired time period subsequent to the initiation of conduction of the opposite of said pair of thyratrons of the said multivibrator network with which the said timing network is associated, a first blocking bias means connected between the other of said control elements and said one principal electrode of one of said thyratrons of said first timing network, a second blocking bias means connected between the other of said control elements and said one principal electrode of each of said thyratrons of the second of said multivibrator networks, a control means actuatable to a first control condition for rendering the other of said thyratrons of said first multivibrator network in a conducting condition, a second bias establishing means associated with said first blocking bias means for periodically increasing the potential between said other control element and said one principal electrode of the other of said thyratrons of said first multivibrator network above said critical value solely when said control means is actuated to its said first condition, a third bias establishing means associated with said second blocking bias means for increasing the potential between said other control element and said one principal electrode of both of said thyratrons of said second multivibrator network, said third bias means acting in response to a change in conduction of said one thyratron of said first multivibrator network and further including a source of pulsating potential.

12. In a control for regulating the flow of electrical energy between an alternating potential source and a load, a pair of multivibrator networks, each said network comprising a pair of thyratrons, each said thyratron having a pair of principal electrodes and a pair of controlling elements, each said thyratron being capable of initiating conduction solely when the potential between one of said principal electrodes and each of said controlling elements is at least as great as its respective critical firing voltage, each said network including a pair of timing networks individually connected between said one principal electrode and one of said controlling elements of its said thyratrons, said timing networks being connected between the respective said one electrode and said one control element of the said thyratron of the said pair of thyratrons to which it is connected as a consequence of the conduction of the other thyratron of the said respective pair of thyratrons for a desired time period subsequent to the initiation of conduction of said other of said respective pair of thyratrons, a first blocking bias means connected between the other of said control elements and said one principal electrode of each of said thyratrons of a first of said multivibrator networks, a second blocking bias means connected between the other of said control elements and said one principal electrode of each of said thyratrons of the second of said multivibrator networks, a sequencing network having a normally de-energized output circuit and means for energizing said circuit at a predetermined period in the voltage wave of such source, a first bias establishing means associated with said first blocking bias means, a switching device having a first position in which said output circuit is connected to energize said first bias means to render said output circuit effective to increase the potential between said other control element and said one principal electrode of one of said thyratrons of a first of said multivibrator networks, a second bias establishing means, a control switch for controlling the effectiveness of said second bias establishing means, said switching device when in a second position acting to associate said second bias establishing means with said first blocking bias means whereby said second bias establishing means, when said control switch is actuated, is effective to increase the potential between said other control element and said one principal electrode of said one thyratron of said first multivibrator network, a third bias establishing means associated with said first blocking bias means and effective in timed relation to the frequency of the alternating potential source for increasing the potential between said other control element and said one principal electrode of the other of said thyratrons of said first multivibrator network, said third bias establishing means being associated with said control switch and rendered ineffective during the time period said control switch is actuated, a fourth bias establishing means associated with said second blocking bias means connected between said other control element and said one principal electrode of said first thyratron of the second of said multivibrator networks, said fourth bias means acting in response to a change in conduction of said other thyratron of said first multivibrator network, and a fifth bias establishing means associated with said blocking bias means and effective in timed relation to the frequency of the alternating potential source for increasing the potential between said other control element and said one principal electrode of said second thyratron of said second multivibrator network, said switching device when in its said first position holding said control switch against actuation.

13. In a seam-spot welding control, a power flow controlling apparatus including a pair of thyratrons, each said thyratron having a pair of main electrodes and a pair of controlling electrodes, a pair of timing networks for said thyratrons, each said timing network having a potential producing output circuit in which said produced potential is a function of the measured time of said respective network, said output circuit of a first of said timing networks being connected between one of said main electrodes and one of said controlling electrodes of one of said thyratrons, said output circuit of the second of said timing networks being connected between one of said main electrodes and one of said controlling electrodes of the other of said thyratrons, a control circuit connected between the other of said controlling electrode and said main electrode of said one thyratron, said control circuit including a first source of potential bias and a pair of potential impressing means for superimposing a triggering potential on said first source of bias, one of said impressing means comprising a source of alternating potential and a source of direct potential, the polarity of said direct potential being in additive relation to said first source of bias, said one impressing means including means for rendering its said direct potential source ineffective to effect said triggering potential of said one impressing means, a sequence timer for energizing the other of said impressing means for initiating an operation of said power flow controlling apparatus as a consequence of an energizing potential pulse produced thereby, a switch means for selecting the one of said impressing means which is effective to furnish a triggering potential to said one thyratron, a source of alternating potential of a phase opposite to the phase of said alternating potential of said one impressing means and connected between the other of said controlling electrode and said one main electrode of said other thyratron, and means, effective during the period that said switch means renders said one impressing means effective, to render said last-named source of alternating potential ineffective to apply a potential to said other thyratron.

14. In a seam-spot welding control, a power flow controlling apparatus including a pair of thyratrons each having a pair of main electrodes and a first controlling electrode, one of said thyratrons having a second controlling electrode, a timing network for said one thyratron, said timing network having a potential producing output circuit in which said produced potential is a function of the measured time of said network, said output circuit being connected between one of said main electrodes and one of said controlling electrodes of said one thyratron, a control circuit connected between said first controlling electrode and one of said main electrodes of the other of said thyratrons, said control circuit including a first source of potential bias and a pair of potential impressing means for superimposing a triggering potential on said first source of bias, one of said impressing means comprising a source of alternating potential and a source of direct potential, the polarity of said direct potential being in additive relation to said first source of bias, said one impressing means including means for rendering its said direct potential source ineffective to effect said triggering potential of said one impressing means, a sequence timer for energizing the other of said impressing means to initiate an operation of said power flow controlling apparatus as a consequence of an energizing potential pulse produced thereby, a switch means effective in a first position to render said one impressing means effective to furnish a triggering potential to said other thyratron and effective in a second position to render said other impressing means effective to furnish a triggering potential to said other thyratron, a source of alternating potential connected between the other of said controlling electrode and said one main electrode of said one thyratron, and a second switch means effective in a first position to render said last-named source of alternating potential effective to apply a potential to said one thyratron and effective in a second position to render said last-named source of alternating potential ineffective to apply a potential to said one thyratron, and a common actuator for said switch means and effective in a first position to maintain both said switch means in their said first positions and effective in a second position to maintain both said switch means in their said second positions.

15. In combination, means for controlling the supply of energy to a load, a control device for controlling a plurality of characteristics of said energy flow and including means for selecting which of said characteristics will occur, a first of said characteristics being the supplying of said energy in the form of at least a half cycle of energy in each of two potential polarities, a second of said characteristics being the supplying of said energy in the form of a single half cycle of energy each actuation of said control device, said control device comprising a first and a second timing network, said first timing network being characterized by the fact that it completes its timing function as a consequence of the happening of two events, one of said events being the timing out of a first timing means and the second of said events being the reception thereby of a synchronizing incident, means for initiating the operation of said first timing network, means responsive to said first timing network for initiating the supplying of said electrical energy to such load, means actuatable as a consequence of the initiation of operation of said first timing network for initiating the operation of said second timing network, means responsive to the timing out of said second timing network for supplying said synchronizing incident to said first timing network, means responsive to the source which supplies energy to said load for supplying said synchronizing incident to said first timing network, and means for selecting which of said last two named means is effective to supply said synchronizing incident to said first timing network.

16. The combination of claim 15 in which there is provided a common actuator for said two selecting means, said common actuator having a first and a second operating position, said common actuator when in said first position being operable to actuate said first-named selecting means to select said first characteristic and to actuate said second-named selecting means to provide for the supplying of said synchronizing incident as a consequence of the timing out of said second timing network.

17. In combination, a control device for controlling a plurality of characteristics of energy flow to a load and including means for selecting which of said characteristics will occur, a first of said characteristics being the supplying of said energy in the form of at least a half cycle of energy in each of two potential polarities, a second of said characteristics being the supplying of said energy in the form of a single half cycle of energy each actuation of said control device, said control device comprising a first and a second timing network, said first timing network being characterized by the fact that it completes its timing function as a consequence of the happening of two events, one of said events being the timing out of a first timing means and the second of said events being the reception thereby of a synchronizing incident, means for initiating the operation of said first timing network, a third timing network having a pair of output circuits and characterized by the fact that one of said output circuits is maintained in an effective condition during the time period of one of said devices and the other of said output circuits is maintained effective during the time period of the other of said devices, a first energy controlling means responsive to the maintaining of said one output circuit effective to cause energy to flow to such load in a first potential polarity, a second energy controlling means responsive to the maintaining of said other output circuit effective to cause energy to flow to such load in a second potential polarity, means responsive to said first timing network for initiating said third timing network, means actuated as a consequence of the initiation of operation of said third timing network for initiating the operation of said second timing network, means responsive to the timing out of said second timing network for supplying said synchronizing incident to said first timing network, means responsive to the source which supplies energy to said load for supplying said synchronizing incident to said first timing network, and means for selecting which of said last two named means is effective to supply said synchronizing incident to said first timing network.

18. In a control device for controlling a plurality of characteristics of energy flow to a load from a source of alternating potential and including means for selecting which of said characteristics will occur, a first of said characteristics being the supplying of said energy in the form of at least a half cycle of energy in each of two potential polarities, a second of said characteristics being the supplying of said energy in the form of a single half cycle of energy each actuation of said control device, a first and a second and a third timing network, each timing network comprising a pair of electric discharge devices and means for blocking each of said discharge devices in response to the initiation of conduction of the other said discharge device, each of said devices having a pair of main electrodes and a pair of controlling electrodes, said first and said third networks each including a first and a second timing circuit, said second timing network including a first timing circuit, each of said timing circuits including an energy storage device and a discharge device connected to discharge the respective said storage device, each said timing circuit further having output terminals in which the potential between said terminals is a function of the potential of its respective said storage device, said terminals of said first timing circuit of each of said timing networks being connected between one of said main electrodes and one of said control electrodes of a respective said first discharge device of the respective said timing networks, said terminals of said second timing circuits of said first and said third timing networks being connected between one of said main electrodes and one of said control electrodes of a respective said second discharge device of the respective said first and third timing networks, biasing means for each of said timing networks, means connecting said biasing means of said first timing network between the other of said control electrodes and said one main electrodes of each of said discharge devices of said first timing network and in a polarity tending to maintain the respective said discharge devices nonconductive, means connecting said biasing means of said third timing network between the other of said control electrodes and said one main electrode of said discharge devices of said third timing network and in a polarity tending to maintain the respective said discharge devices nonconductive, means connecting said biasing means of said second timing network between the other of said control electrodes and said one main electrode of said first discharge device of said second timing network and in a polarity tending to maintain the respective said discharge device nonconducting, biasing means connected between one of said control electrodes and one of said main electrodes of second discharge device of said second timing network, means for controlling the initiation of conduction of said first discharge device of said first timing network and the initiation of operation of said second timing circuit of said first timing network, means for overcoming the blocking bias applied by said biasing means between said other control electrode and said one main electrode of said first discharge device of said third timing network and rendered effective as a consequence of the blocking of said just-mentioned second discharge device, means responsive to the conduction of said first discharge device of said third timing network for initiating of flow of electrical energy of a first polarity of such load, means responsive to the initiation of conduction of each of said discharge devices of said third timing network for initiating the conduction of said second discharge device of said second timing network to initiate a timing out of said timing circuit of said second timing network, means associated with said biasing means of said second timing network and operable in timed relation to the frequency of the source for periodically overcoming the blocking bias between said other control electrode and said one main electrode of said first discharge device of said second timing network, means associated with said biasing means of said first timing network and responsive to the timing out of said first discharge device of said second timing network for overcoming the blocking bias between said other control electrode and said one main electrode of said second discharge device of said first timing network, means associated with said just-named biasing means and responsive to the frequency of the source for periodically overcoming said just-named blocking bias, selecting means operable at a first setting for rendering the first means of said two last-named means effective and operable at a second setting to render the second means of said two last-named means effective, means associated with said biasing means of said third timing network and operable in timed relation to the frequency of the source for periodically overcoming the blocking bias between said other control electrode and said one main electrode of said second discharge device of said third timing network, and means actuatable by said selecting means for rendering the time interval of said second timing circuit of said first timing network of lesser duration than that of said second timing circuit of said third network when said selecting means is set to said second setting.

19. In a control for supplying electrical energy from a source of electrical energy at one frequency to a load at a different frequency, a first timing network for determining the overall time period during which energy is to flow to such load, a second timing network for determining the frequency of the energy supplied to such load, a third timing network, each said network comprising a pair of electric valves connected across a source of direct potential energy, each network including means responsive to the initiation of conduction of one of its respective said valves for rendering the other of its respective said valves nonconducting and vice versa whereby solely one of said valves will conduct at one time, each said valve having a pair of electrode means, a timing circuit individually associated with said electrode means of each said valve of said first and second timing networks for controlling the minimum time period which must elapse between the rendering of its associated said valve nonconductive and the rendering of its associated said valve conductive, a plurality of synchronizing circuits for determining the precise instant relative to the frequency of said source that said valves conduct, a first of said synchronizing circuits being associated with said electrode means of a first valve of said first network and normally maintained ineffective to render said first valve of said first network conductive, a second of said synchronizing circuits being associated with said electrode means of the second of said valves of said first network and periodically energized as a consequence of the conduction of a first valve of said third network, a third of said synchronizing circuits being associated with said electrode means of a first valve of said second network and normally maintained ineffective to render said first valve of said second network conductive, means actuated in response to a nonconductive condition of said second valve of said first network for rendering said third synchronizing circuit effective, a fourth synchronizing circuit associated with said electrode means of said first valve of said third network, and means responsive to a conductive condition of said second valve of said second timing network for initiating operation of said third network.

20. In a control system for controlling the flow of electrical energy from a three phase source of commercial frequency to a single phase load at a lesser frequency, a plurality of multivibrator type timing networks, each said network including a pair of thyratrons and a basic timing circuit and a pair of synchronizing circuits, a first and a second of said networks including a second basic timing network, each said multivibrator network being characterized by the fact that the initiation of conduction of one of said thyratrons acts to render the other of said thyratrons nonconductive and that said first basic timing circuit thereafter prevents conduction of a first of said thyratrons for a desired time interval subsequent to its being rendered nonconductive, said first and said second multivibrator networks being further characterized by the fact that their said second basic timing circuits prevent conduction of their second said thyratrons for a desired time interval subsequent to their being rendered nonconductive, each said multivibrator network further being characterized by the fact that a first of said synchronizing circuits determines the precise instant at which said first thyratron conducts and that the second of said synchronizing circuits determines the precise instant at which said second thyratron conducts, a sequencing network for controlling the sequencing of a plurality of events one of which is the supplying of a pulse of potential, a pair of interpulse timing networks, each said interpulse network including a normally conducting thyratron and a normally blocked thyratron and a time delay circuit for determining the time interval between the blocking of said normally conducting thyratron and the initiation of conduction of said normally blocked thyratron, a pair of indexing networks, each said indexing network comprising a lead thyratron and two trailing thyratrons, each said thyratron of said indexing networks having a pair of main electrodes and a control electrode, a three phase phase-shifting network having three output circuits, circuit means connecting a first output circuit of said phase-shifting network between said main electrodes of said lead thyratron of each of said indexing networks, circuit means connecting a second output circuit of said phase-shifting network between said main electrode of a first of said two trailing thyratrons of each of said indexing networks, circuit means connecting a third output circuit of said phase-shifting network between said main electrodes of a second of said two trailing thyratrons of each of said indexing networks, said thyratrons of one of said indexing networks being arranged to conduct during one half cycle of said source and said thyratrons of the other of said indexing networks being arranged to conduct during the other half cycle of said source, a contactor network comprising three pairs of ignitrons, circuit means interconnecting said lead thyratron of said one indexing network with said first trailing thyratron of said one indexing network and with a first ignitron of a first of said pairs of ignitrons and effective as a consequence of the conduction of said just-mentioned lead thyratron to render said just-mentioned first trailing thyratron and said just-mentioned first ignitron conductive, circuit means interconnecting said just-mentioned first trailing thyratron with said second thyratron of said one indexing network and with a first ignitron of a second of said pairs of ignitrons and effective as a consequence of the conduction of said just-mentioned first trailing thyratron to render said just-mentioned second trailing thyratron and said just-mentioned first ignitron conductive, circuit means interconnecting said just-mentioned second trailing thyratron and a first ignitron of a third of said pairs of ignitrons and effective as a consequence of the conduction of said just-mentioned second trailing thyratrons to render said just-mentioned first ignitron conductive, circuit means interconnecting said lead thyratron of the second of said indexing networks with said first trailing thyratron of said second indexing network and the second ignitron of said first pair of ignitrons and effective as a consequence of the conduction of said just-mentioned lead thyratron to render said just-mentioned second ignitron and said just-mentioned first trailing thyratron conductive, circuit means interconnecting said just-mentioned first trailing thyratron with the second ignitron of said second pair of ignitrons and said second trailing thyratron of said second indexing network and effective as a consequence of the conduction of said just-mentioned first trailing thyratron to render said just-mentioned second ignitron and said just-mentioned second trailing thyratron conductive, circuit means interconnecting said just-mentioned second trailing thyratron with the second ignitron of said third pair of ignitrons and effective as a consequence of the conduction of said just-mentioned second trailing thyraton, circuit means responsive to a conducting condition of said normally nonconducting thyratron of one of said interpulse network for rendering said lead thyratron of said first indexing network conductive, circuit means responsive to a conducting condition of said normally nonconductive thyratron of the other of said interpulse networks for rendering said lead thyratron of said second indexing network conductive, said second synchonizing circuit of said first multivibrator network including a secondary winding of a transformer energized as a consequence of the conduction of said first thyratron of said third multivibrator network, said synchronizing circuits of said first multivibrator network also including a first source of direct potential bias, said first synchronizing circuit of said first multivibrator network including said first direct potential bias and a pair of terminals connected to receive said potential pulse from said sequencing network, a potential supplying element which is energized and de-energized as a consequence of the conduction and blocking of said first thyratron of said first multivibrator network, said synchronizing circuits of said second multivibrator network each including said potential supplying element, said first synchronizing circuit of said second multivibrator network also including a secondary winding of a transformer energized from said source, said second synchronizing circuit of said second multivibrator network including a secondary winding of a transformer energized from said source, each said synchronizing circuits of said second multivibrator network being effective, solely when said potential supplying element is de-energized, to render its respective said thyratron conductive, said second synchronizing circuit of said third multivibrator network being energized as a consequence of the initiation of conduction of each of said thyratrons of said second multivibrator network, said first synchronizing circuit of said third multivibrator network including a secondary winding of a transformer energized from said source.

21. In a control system for controlling the flow of electrical energy from a three phase source of commercial frequency to a single phase load at a lesser frequency, a plurality of multivibrator type timing networks, each said network including a pair of thyratrons and a first basic timing circuit and a pair of synchronizing circuits, a first and a second of said networks including a second basic timing network, each said multivibrator network being characterized by the fact that the initiation of conduction of one of said thyratrons acts to render the other of said thyratrons nonconductive and that said first basic timing circuit thereafter prevents conduction of a first of said thyratrons for a desired time interval subsequent to its being rendered nonconductive, said first and said second multivibrator networks being further characterized by the fact that their said second basic timing circuits prevent conduction of their second said thyratrons for a desired time interval subsequent to their being rendered nonconductive, each said multivibrator network further being characterized by the fact that a first of said synchronizing circuits determines the precise instant at which said first thyratron conducts and that the second of said synchronizing circuits determines the precise instant at which said second thyratron conducts, a sequencing network for controlling the sequencing of a plurality of events, one of which is the supplying of a pulse of potential, a pair of interpulse timing networks, each said interpulse network including a normally conducting thyratron and a normally blocked thyratron and a time delay circuit for determining the time interval between the blocking of said normally conducting thyratron and the initiation of conduction of said normally blocked thyratron, a pair of indexing networks, each said indexing network comprising a lead thyratron and two trailing thyratrons, each said thyratron of said indexing networks having a pair of main electrodes and a control electrode, a three phase phase-shifting network having three output circuits, circuit means connecting a first output circuit of said phase-shifting network between said main electrodes of said lead thyratron of each of said indexing networks, circuit means connecting a second output circuit of said phase-shifting network between said main electrode of a first of said two trailing thyratrons of each of said indexing networks, circuit means connecting a third output circuit of said phase-shifting network between said main electrodes of a second of said two trailing thyratrons of each of said indexing networks, said thyratrons of one of said indexing networks being arranged to conduct during one half cycle of said source and said thyratrons of the other of said indexing networks being arranged to conduct during the other half cycle of said source, a contactor network comprising three pairs of ignitrons, circuit means interconnecting said lead thyratron of said one indexing network with said first trailing thyratron of said one indexing network and with a first ignitron of a first of said pairs of ignitrons and effective as a consequence of the conduction of said just-mentioned lead thyratron to render said just-mentioned first trailing thyratron and said just-mentioned first ignitron conductive, circuit means interconnecting said just-mentioned first trailing thyratron with said second thyratron of said one indexing network and with a first ignitron of a second of said pairs of ignitrons and effective as a consequence of the conduction of said just-mentioned first trailing thyratron to render said just-mentioned second trailing thyratron and said just-mentioned first ignitron conductive, circuit means interconnecting said just-mentioned second trailing thyratron and a first ignitron of a third of said pairs of ignitrons and effective as a consequence of the conduction of said just-mentioned second trailing thyratrons to render said just-mentioned first ignitron conductive, circuit means interconnecting said lead thyratron of the second of said indexing networks with said first trailing thyratron of said second indexing network and the second ignitron of said first pair of ignitrons and effective as a consequence of the conduction of said just-mentioned lead thyratron to render said just-mentioned second ignitron and said just-mentioned first trailing thyratron conductive, circuit means interconnecting said just-mentioned first trailing thyratron with the second ignitron of said second pair of ignitrons and said second trailing thyratron of said second indexing network and effective as a consequence of the conduction of said just-mentioned first trailing thyratron to render said just-mentioned second ignitron and said just-mentioned second trailing thyratron conductive, circuit means interconnecting said just-mentioned second trailing thyratron with the second ignitron of said third pair of ignitrons and effective as a consequence of the conduction of said just-mentioned second trailing thyratron, circuit means responsive to a conducting condition of said normally nonconducting thyratron of one of said interpulse networks for rendering said lead thyratron of said first indexing network conductive, circuit means responsive to a conducting condition of said normally nonconductive thyratron of the other of said interpulse networks for rendering said lead thyratron of said second indexing network conductive, a switching device having two positions, said synchronizing circuits of said first multivibrator network each including a secondary winding of a transformer energized from said source, said just-mentioned synchronizing circuits also including a first and a second source of direct potential bias, said first synchronizing circuit of said first multivibrator network including its said secondary winding and said first and second direct potential bias and a pair of terminals connected to receive said potential pulse from said sequencing network and further including said switching device, said switching device being effective in a first of its said two positions to render said second thyratron of said first multivibrator effective to respond to its associated said transformer winding and said first and said second direct potential bias, said switching device being effective in a second of its said two positions to render said just-mentioned second thyratron effective to respond to said potential pulse produced by said sequencing network and said first direct potential bias, said second synchronizing circuit of said first multivibrator network including its said secondary winding and another secondary winding of a transformer energized as a consequence of the initiation of conduction of said first thyratron of said third multivibrator network and also including said switch device and said first direct potential bias, said switch device being effective in its said first position to render said first thyratron of said first multivibrator network responsive to said just-mentioned secondary winding which is energized from said source and effective in its said second position to be responsive to said just-mentioned secondary winding which is energized from said third multivibrator network, said first synchronizing circuit of said second multivibrator network including a potential supplying element which is energized and de-energized as a consequence of the conduction and blocking of said first thyratron of said first multivibrator network, said just-mentioned first synchronizing circuit also including a secondary winding of a transformer energized from said source and effective, solely when said potential supplying element is de-energized, to render said second thyratron of said second multivibrator network conductive, said second synchronizing circuit of said second multivibrator network including a secondary winding of a transformer energized from said source, means energizing said second synchronizing circuit of said third multivibrator network as a consequence of the initiation of conduction of each of said thyratrons of said second multivibrator network, said first synchronizing circuit of said third multivibrator network including a secondary winding of a transformer energized from said source, and initiating means effective at one position thereof, and solely when said switch device is in its said first position, to render ineffective said second direct bias of said first synchronizing circuit of said first multivibrator network and further to render ineffective said source energized secondary winding of said second synchronizing circuit of said first multivibrator network.

References Cited in the file of this patent

UNITED STATES PATENTS

| | | |
|---|---|---|
| 2,295,601 | Overbeck | Sept. 15, 1942 |
| 2,309,280 | Stansbury | Jan. 26, 1943 |
| 2,476,882 | Lexa | July 19, 1949 |
| 2,518,118 | Bivens | Aug. 8, 1950 |
| 2,549,831 | Longini | Apr. 24, 1951 |
| 2,577,411 | Faulk | Dec. 4, 1951 |
| 2,600,941 | Undy | June 17, 1952 |
| 2,614,240 | Bivens | Oct. 14, 1952 |
| 2,656,461 | Elliott | Oct. 20, 1953 |
| 2,683,851 | Parsons | July 13, 1954 |
| 2,748,343 | Hartwig et al. | May 29, 1956 |